US008548292B2

(12) United States Patent
Rogers et al.

(10) Patent No.: US 8,548,292 B2
(45) Date of Patent: Oct. 1, 2013

(54) HYBRID INTEGRATED OPTICAL ELEMENTS

(75) Inventors: David Rogers, Ipswich (GB); Graeme Maxwell, Ipswich (GB); Sebastien Lardenois, Ipswich (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 13/056,553

(22) PCT Filed: Jul. 27, 2009

(86) PCT No.: PCT/GB2009/050925
§ 371 (c)(1),
(2), (4) Date: Jan. 28, 2011

(87) PCT Pub. No.: WO2010/013036
PCT Pub. Date: Feb. 4, 2010

(65) Prior Publication Data
US 2011/0164849 A1    Jul. 7, 2011

(30) Foreign Application Priority Data

Jul. 28, 2008    (GB) .................................. 0813784.6

(51) Int. Cl.
*G02B 6/42* (2006.01)
*G02B 6/36* (2006.01)
*G02B 6/12* (2006.01)

(52) U.S. Cl.
USPC ................................ 385/52; 385/88; 385/129

(58) Field of Classification Search
None
See application file for complete search history.

(56) References Cited

U.S. PATENT DOCUMENTS

| 5,256,869 A | 10/1993 | Lin et al. |
| 5,966,486 A | 10/1999 | Boudreau et al. |
| 6,118,917 A | 9/2000 | Lee et al. |
| 6,250,819 B1 | 6/2001 | Porte et al. |
| 6,485,198 B1 | 11/2002 | Chang et al. |
| 6,493,121 B1 | 12/2002 | Althaus |
| 6,786,654 B2 | 9/2004 | Kilian |
| 7,603,005 B2 | 10/2009 | Shioda |
| 2003/0091262 A1 | 5/2003 | Maxwell |

FOREIGN PATENT DOCUMENTS

| EP | 0 703 477 | 3/1996 |
| EP | 0 989 641 | 3/2000 |
| EP | 1754763 | 2/2007 |

(Continued)

OTHER PUBLICATIONS

The International Search Report and the Written Opinion of the International Searching Authority dated Oct. 7, 2009; 17 pages.
UK IPO Search Report 1, dated Nov. 28, 2008; 7 pages.
UK IPO Search Report 2, dated May 21, 2009; 4 pages.

(Continued)

*Primary Examiner* — Jerry Rahll
(74) *Attorney, Agent, or Firm* — Slater & Matsil, L.L.P.

(57) ABSTRACT

The present invention provides an assembly (1) of integrated optical components and methods of producing thereof wherein the assembly (1) of optically linked optical components comprises a motherboard (2) having one or more primary lateral reference features (28) and a sub-assembly (20) comprising an optical component (22) mounted on a daughterboard (24), said sub-assembly (20) having one or more secondary lateral reference features (30). The primary lateral reference features may be optical alignment features. The daughterboard (24) may be mounted on the motherboard (2) such that the optical component (22) may extend into a motherboard recess (18). The lateral alignment of the component (22) with the motherboard (2) is provided by aligning the primary (28) and secondary lateral reference features (30). The daughterboard (24) may further comprise tertiary lateral reference features (42) which in combination with the secondary lateral reference features 30 form a self correcting alignment system.

18 Claims, 15 Drawing Sheets

(56) References Cited

FOREIGN PATENT DOCUMENTS

| | | |
|---|---|---|
| GB | 2379995 | 3/2003 |
| JP | 1997-073028 | 3/1997 |
| WO | WO 93/15424 | 8/1993 |
| WO | WO 2004/019098 | 3/2004 |
| WO | WO 2004/086111 | 10/2004 |
| WO | WO 2006/059510 | 6/2006 |
| WO | WO 2006/129123 A1 | 12/2006 |

OTHER PUBLICATIONS

Maxwell, G., et al., "Very low coupling loss, hybrid-integrated all-optical regenerator with passive assembly," $28^{th}$ European Conference on Optical Communication, 2002, vol. 5, 2 pages.

Communication pursuant to Article 94(3) EPC received in Application No. 09 785 399.8-1562, Applicant: Huawei Technologies Co., Ltd., mailed Feb. 28, 2013, 6 pages.

Chinese Search Report for Chinese Application No. 2009/801378471, mailed Mar. 26, 2013, 2 pages.

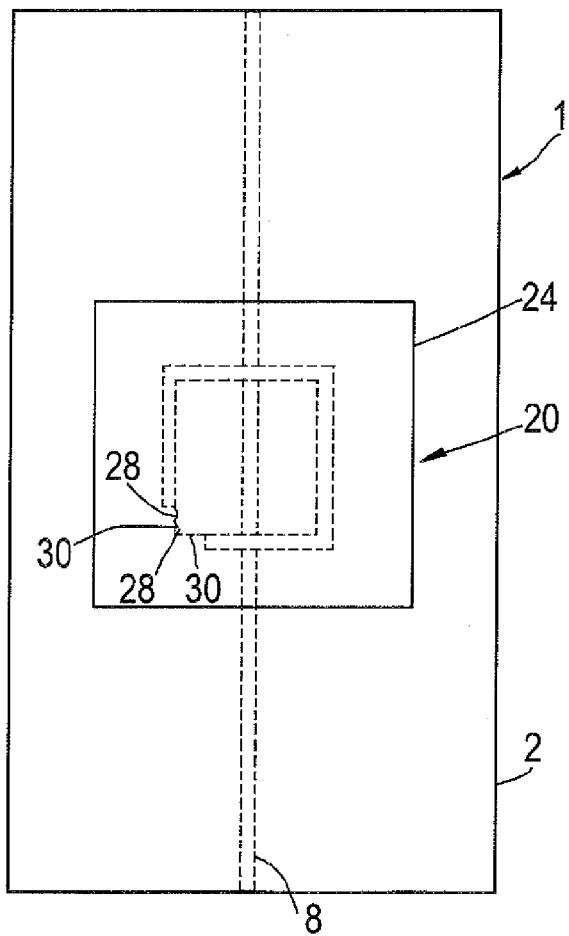
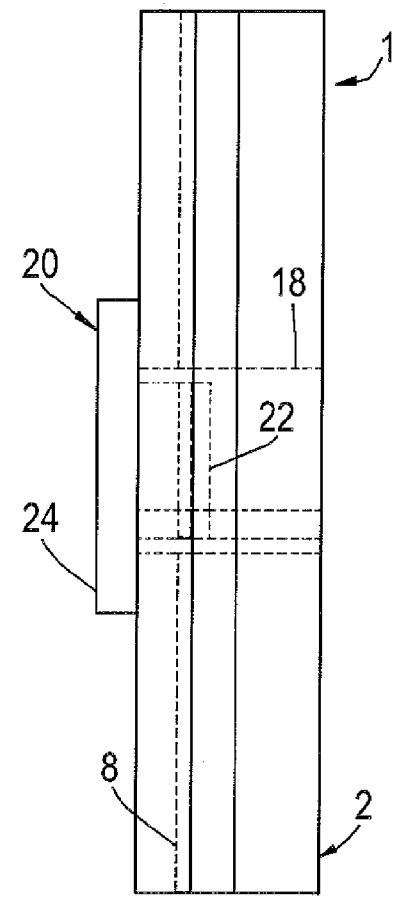
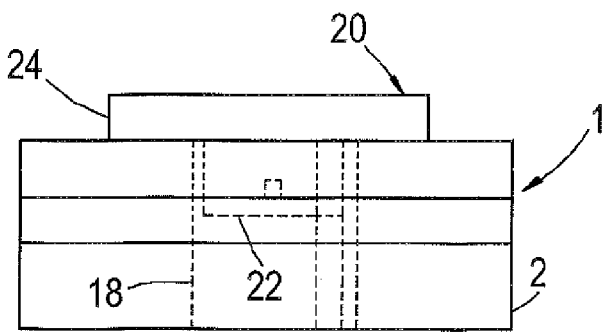

HYBRID INTEGRATED OPTICAL ELEMENTS

This application claims the benefit of International patent application PCT/GB2009/050925 entitled "HYBRID INTEGRATED OPTICAL ELEMENTS" filed on 27 Jul. 2009, which is expressly incorporated herein by reference, and which claims priority to United Kingdom Patent Application No. 0813784.6, entitled HYBRID INTEGRATED OPTICAL ELEMENTS" filed on 28 Jul. 2008.

FIELD OF THE INVENTION

This invention relates to integrating and aligning optical components in an optical assembly. The optical assemblies referred to in this application are typically hybrid, integrated-optic assemblies for fibre optic systems. The application of the invention may extend to other fields of technology such as optical sensing, medical optics and bio-photonics.

RELATED ART

Optical devices or assemblies are often and increasingly required to perform complex functions. Such functions include for example, optical amplification, optical filtering, optical isolation, optical regeneration, detecting and transmitting optical signals. The ability of a device to perform these functions is often critically dependent upon the material media making up the device. Different material media are more suited to some functions than others due to the inherent properties they possess and their ability to be effectively manufactured into working devices.

As the number of functions required by an optical assembly increases, it becomes advantageous to incorporate several optical devices into one assembly. It is also desirable that each component or functioning optical element is manufactured and optimised to one or more specific functions. A form of integration is then required to mechanically join and optically link separate components together.

Hybrid integration is one such method, where separately formed and optimised devices are assembled into one operating assembly. In a hybrid integration system the module or assembly typically comprises a motherboard onto which optical devices are mounted. The motherboard may also comprise one or more inbuilt optical components.

Such inbuilt optical components are often passive integrated optic waveguides formed of a polymer, silicon or a silica based material. Passive waveguides are usually optimised in material, cross-section and method of manufacture to have a low propagation loss and/or low coupling loss to other integrated optical components.

Several methods exist to hybrid integrate separate optical components together. One key issue that each method must address is the optical coupling between the separate integrated optical components.

One hybrid integration method that uses mechanical alignment between optical components is US patent application US2003/0091262 wherein active optical devices are affixed and electrically connected to a daughterboard. The combined sub-assembly of daughterboard and active device is then mechanically and electrically connected to a waveguide motherboard by flip chip mounting the sub assembly onto the waveguide motherboard (flip chip mounting is described in more detail below) and mechanically aligning the daughterboard to mechanical locating stops on a motherboard.

Another method of using mechanical alignment features in an integration scheme is described in US patent document U.S. Pat. No. 6,118,917. In this document an array of fibres is mechanically located in grooves in an optical fibre block. The optical fibre block also has alignment grooves that mechanically locate with alignment ridges on an alignment platform.

Another method of using mechanical alignment features in an integration scheme is described in U.S. Pat. No. 6,250,819. In this document a motherboard comprises one or more sets of parallel grooves that are used to mechanically locate and position optical fibres and sets of female aperture microstructures. An integrated optical circuit chip comprising male microstructures is integrated with the motherboard by fitting the male microstructures into the female microstructures by sliding and embedding the stem of the male microstructure against an end of the female microstructure.

Other documents that disclose to use mechanical alignment for optical integration include U.S. Pat. No. 5,966,486, EP0703477, WO9315424, WO2006/059510 and GB2379995. The method of assembly and optical alignment in US2003/0091262 comprises milling a cavity in a waveguide chip, forming a locating stop on the waveguide chip, forming reference regions on a sub assembly carrying an active component, one reference region locating the active component, one adapted to engage the surface of a cladding layer and the locating stop, and connecting the sub assembly to the waveguide chip.

One method of providing accurate alignment reference edges and regions on a motherboard is described in "Self aligned packaging of an 8×8InGaAsP—InP switch" by G Wenger et al, Journal of Selected Topics in Quantum Electronics, volume 3, number 6, December 1997 (referred to hereinafter as "Wenger"). This document describes the use of V-grooves on a silicon chip as optical alignment reference regions used to integrate signal optical fibres mounted on a second chip. These alignment V-grooves are separate recesses to the main recess where the signal fibres are integrated In Wenger separate V-grooves formed on the second chip house separate alignment fibres which are then, in turn located into separate alignment V-grooves on the main chip. The alignment fibres mounted on the second chip are mounted separate to the integrated signal fibres on the second chip and thus may incur their own geometric and positional inaccuracies that are independent and unrelated to the actual final mounted position of the signal fibres. The geometric inaccuracies may include defects in the alignment fibre cross section whilst the positional inaccuracies may result from an error in the design and/or manufacture of the separate alignment v-grooves on the second and/or main chip. The separate alignment fibres accommodated in separate v-grooves on the second chip and main chip may therefore comprise errors that are independent of errors in the location of the signal fibres. As a result, positional offsets of the signal fibres resulting from manufacturing errors in the signal fibre locating features may not be sufficiently compensated for by the alignment system in Wenger.

When integrating optical fibres to a device with multiple optical input channels, it is common to use a parallel array of optical fibres. These fibres are often mounted onto a rectangular block with or without the aid of V-grooves. The block and fibre are then simultaneously polished back to provide an array of polished fibre facets flush with an edge of the carrying block. The array of fibres mounted on the block is then brought into alignment with waveguides or other components at a motherboard interface.

One such block is described in the "V-groove Assemblies" product sheet at www.ozoptics.com/ALLNEW_PDF/DTS0083.pdf. This document shows optical fibres mounted on a silicon V-groove chip, covered on top by a glass block and polished to provide a flush end face.

Another method of integrating arrays of fibres is described in "Very low coupling loss, hybrid-integrated all-optical regenerator with passive assembly" by G Maxwell et al, post deadline paper PD3.5, European Conference of Optical Communications 2002. In this document, fibre arrays are mounted in a set of V-grooves formed on a back end of a separate silicon daughterboard. The front end of the daughterboard is shaped in-plane like an arrow. An arrow-shaped set of locating stops are formed on top of the motherboard. These stops were complementary to the shape of the silicon daughterboard front end and provided the in-plane optical alignment reference edges for the integrated fibre array. The locating stops are made from a polymer-resist material. Patterned resist materials suffer from degrees of shape deformation such as feature shrinkage. Such deformation may be dependant upon fabrication conditions and may vary from fabrication run to fabrication run. The designed size of the stops, hence the position of reference edges on the motherboard, may therefore be different to the final size and position of the actual reference edge.

U.S. Pat. No. 6,786,654 discloses an optical assembly with a cavity that couples an optical component to an optical fibre. The assembly comprises a substrate mounted optical fibre, a separate second section attached to the top surface of the substrate, wherein the second section has an opening to allow the optical fibre to pass through it, and an optical component mounted on the underside of a cap. The cap is mounted on top of the second section. U.S. Pat. No. 6,786,654 creates a hermetic seal by filling the opening in the second section as well as forming a hermetic seal between the cap and the second section.

SUMMARY OF THE INVENTION

The scope of the present invention is as set out in the appended claims.

In one aspect of the present invention there is provided an assembly of optically linked optical components comprising: a motherboard having one or more primary lateral reference features; a sub-assembly comprising an optical component mounted on a daughterboard, said sub-assembly having one or more secondary lateral reference features, the daughterboard being mounted on the motherboard such that alignment of the daughterboard with respect to the motherboard is provided by through alignment of the primary and secondary lateral reference features; the daughterboard comprises one or more tertiary lateral reference features in predefined position relative to the secondary lateral reference features; and alignment of the optical component with respect to the secondary lateral reference features is provided through alignment of the optical component with the tertiary lateral reference features; one or more of the primary lateral reference features are optical alignment features.

According to this aspect of the present invention there is further provided a method of forming an assembly of optically linked optical components comprising the steps of: providing a motherboard; providing a daughterboard; aligning the optical component with the tertiary reference features; and optically aligning the primary and secondary lateral reference features.

In one aspect of the present invention the assembly may have primary reference features comprising one or more marks defined within and/or on the surfaces of the motherboard; and secondary reference features comprising one or more secondary lateral surfaces or marks defined within and/or on the surfaces of the daughterboard respectively.

In one aspect of the present invention there is provided a daughterboard comprising self-correcting alignment features operative to passively align and optically link optical components on the daughterboard with optical components on a motherboard.

In one aspect of the present invention, the motherboard recess comprises walls operative to act as lateral reference surfaces to align the said optical component. The recess walls comprising the lateral reference surfaces are adapted to contact complementary lateral reference surfaces located on the daughterboard and/or the daughterboard optical component of the sub-assembly.

This aspect of the invention provides an assembly of optically linked optical components comprising a motherboard having a face and at least one recess, at least part of a wall of said recess defining one or more primary lateral reference surfaces; a sub-assembly comprising an optical component mounted on a daughterboard, said sub-assembly having one or more secondary lateral reference surfaces; the daughterboard being mounted on the motherboard such that the optical component extends into the recess and such that lateral alignment of the component within the recess is provided by contact of some or all of the primary lateral reference surfaces with some or all of the secondary lateral reference surfaces.

Furthermore the invention provides an assembly wherein the recess further defines one or more additional primary lateral reference surfaces adapted to receive one or more secondary lateral reference surfaces of a further sub-assembly.

In any aspect of the present invention there is provided an assembly wherein at least part of the face of the motherboard provides a primary depth reference surface; the daughterboard has a secondary depth reference surface; and transverse alignment of the component through the recess is provided by contact between the primary and secondary depth reference surfaces.

Furthermore the invention provides an assembly wherein one or more of the secondary lateral reference surfaces are on the daughterboard optical component and/or on the daughterboard.

Furthermore the invention provides an assembly wherein the daughterboard optical component is located against one or more tertiary lateral reference surfaces on the daughterboard. One or more of the secondary lateral reference surfaces and one or more of the tertiary lateral reference surfaces may be parallel and face the same direction. The secondary and/or tertiary lateral reference surfaces may be located on one or more stops on the daughterboard.

Furthermore the invention provides an assembly wherein the primary lateral reference surfaces define a first group of reference surfaces adapted to contact secondary lateral reference surfaces of a first type of sub-assembly, and a second group of reference surfaces adapted to contact secondary lateral reference surfaces of a second type of sub-assembly.

The above aspects are combinable and are not mutually exclusive.

Further features of the invention are as set out in the claims and are exemplified in the following illustrative description with reference to the drawings.

BRIEF DESCRIPTION OF THE DRAWINGS

FIGS. 3a to 3c show the respective plan, side and end-on views of an optical assembly of the present invention comprising the motherboard and sub-assembly of FIGS. 1 and 2.

FIGS. 8b and 8c show two variations of sub assemblies carrying optical fibres that can be integrated with the motherboard of FIG. 8a.

FIGS. 10a and 10b respectively show a sub assembly comprising an array of angle faced optical fibres and a motherboard comprising a recess adapted to integrate the sub assembly of FIG. 10a.

FIG. 11b shows an array of optical fibres mounted on the daughterboard of the sub-assembly of FIG. 11a.

FIGS. 14b to 14d show sub-assemblies adapted to be integrated with the motherboard of FIG. 14a.

FIG. 15 shows an optical assembly comprising the sub assemblies of FIGS. 14b to 14d integrated with the motherboard of FIG. 14a.

DESCRIPTION

Figure 1A:
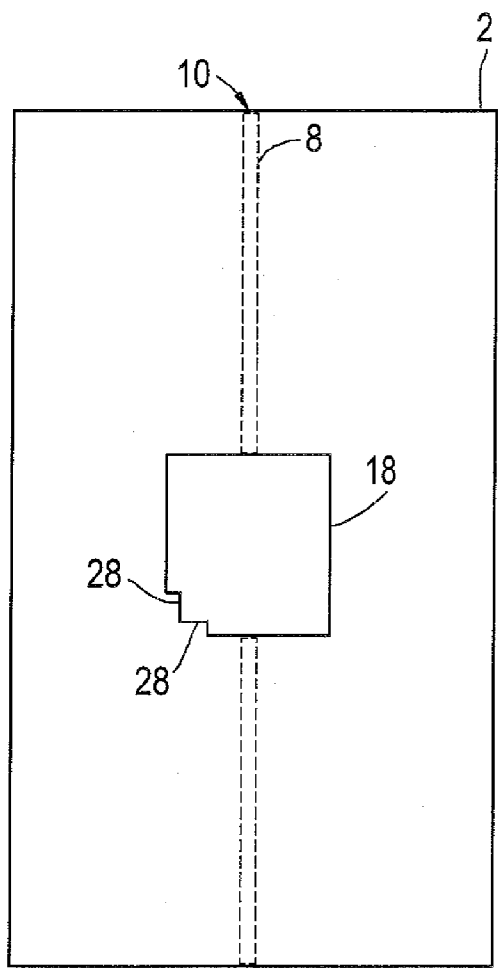
FIGS. 1a to 1c show the respective plan, side and end-on views of a motherboard of the present invention.

The present invention addresses problems encountered in forming optical assemblies 1 when integrating and optically aligning a sub-assembly 20 onto a motherboard 2 which typically has a planar top surface. The sub-assembly 20 comprises an optical component 22 carried on a daughterboard 24, the motherboard 2 comprises a recess 18 to accommodate the optical component 22.

Typically a motherboard 2 has in-plane length and width dimensions ranging from 5 mm up to 15 cm, preferably 5 cm, although it is envisaged that the invention may be successfully applied to motherboard dimension ranges outside of these typical dimensions.

Optical components 22 integrated into an optical assembly 1 of the present invention may typically include opto-electronic chips such as lasers, semiconductor optical amplifiers and optical modulators. Optical components 22 have in-plane dimensions typically ranging from 70 µm to 2 cm, more typically 3 mm, although it is envisaged that the invention may also, in principle, use optical components 22 with larger or smaller dimensions, or other types of optical components 22 such as small bulk optic components or passive optical chips.

Typically a daughterboard 24 has in-plane length and width dimensions ranging from 1 mm up to 20 mm, preferably 10 mm, although it is envisaged that the invention may be successfully applied to daughterboard dimension ranges outside of these typical dimensions.

Having a daughterboard 24 for carrying an optical component 22 has a number of advantages over simply placing the optical component 22 directly on the motherboard 2. Firstly, optical components 22 may be very small and/or very delicate. Once securely mounted onto the daughterboard 24, the combined sub-assembly 20 is then adjusted via pushing and adjusting the daughterboard 24 to manipulate the optical component 22 into optical alignment with other optical components 10, 22. The daughterboard 24 typically has larger in-plane dimensions than the optical component 22 and therefore is easier to handle and less likely to be damaged when forming the assembly 1. Furthermore, because the optical component 22 is not directly pushed during lateral alignment, any damage caused by contact of the manipulation tool is caused to the daughterboard 24 rather than the optical component 22.

The out-of-plane or 'transverse' alignment between optically linked components of the assembly 1 of the present invention may be accomplished by contacting and referencing a part of daughterboard 24 with a part of the motherboard 2. Typically, at least part of the surface of the motherboard 2 provides a primary depth reference surface and at least part of the daughterboard 24 has a secondary depth reference surface. When contact is made between the primary and secondary depth reference surfaces, transverse alignment of the optical component 22 through the recess 18 is accomplished.

The mounting technique used in the present invention is flip chip mounting. In flip chip mounting/integration, the sub-assembly 20 is inverted and mounted onto the recess 18 so that the top surface of the daughterboard 24 (on which the daughterboard-optical component is mounted) sits on top of the motherboard surface. The daughterboard therefore contacts the surface of the motherboard 2 such that the daughterboard-optical component 22 extends from the daughterboard 24 at least partially into the recess 18. Although flip chip mounting is exemplified throughout the application, the invention is not limited in principle to flip chip mounting and may utilise any form of mounting/integration technique.

When generally integrating and optically aligning any device onto a motherboard 2 it is typical to firstly align transversely the device by placing the device on a motherboard depth reference feature. Once contact between the motherboard 2 and device depth reference surfaces has been achieved, the lateral alignment is then facilitated by moving the device laterally about the plane of the motherboard 2. As the device is being laterally slid into position, friction is caused between the two sliding surfaces. If the device is a delicate optical component 22 the action of lateral alignment may damage the component 22 mechanically and/or electrically render the assembly 1 faulty. Because in the present invention, the secondary depth reference surfaces are located on a daughterboard 24 instead of the optical component 22, the optical component 22 is not slid across a face of the motherboard 2 and thus is not damaged by the sliding action.

Another advantage of pre-mounting the optical component 22 onto a daughterboard 24 is that the component 22 may be tested prior to integration in a simplified and safer manner. When active optical components 22 are electrically connected to the daughterboard 24, temporary electrical connections made on a testing rig, prior to the component 22 being integrated, are made with electrical contacts on the daughterboard 24 rather than on the small and delicate active component 22. Connections to active components 22 are difficult to make and may damage the component 22. If, upon integration, the component 22 does not perform its function properly, the combined sub-assembly 20 of daughterboard 24 and optical component 22 can be easily and safely removed and re-tested. Additionally or alternatively, optical components 22 that are manufactured on a wafer may be split into bars and electrically and optically tested before the bar is cleaved, so that the state of the optical components are known before assembly on to daughterboards 24.

Another advantage of carrying the optical component 22 on a daughterboard 24 is that the electrical and mechanical connection points on a daughterboard 24 are not limited to the size and shape of the optical component 22. The daughterboard 24 therefore may comprise well defined and stable electrical and mechanical connection points. These connection points facilitate greater strength in mechanical connection to the motherboard 2 than when individual components 22 are mounted on the motherboard 2 directly.

Once mechanically and electrically connected to the motherboard 2, a daughterboard 24 may also be removed from the motherboard 2 with a reduced risk of damaging the optical component 22. Large and stable electrical connections are also favourable when active optical components 22 need to be burnt-in prior to assembly 1 on the motherboard 2. By burning in and testing an optical component 22 on a daughterboard 24 the functioning state of the optical component 22 can be known prior to assembly.

In one aspect of the present invention there is provided a daughterboard 24 with self correcting alignment features. The self correcting alignment features comprise a set of mechanical or visual alignment features used firstly to align the optical component 22 to the daughterboard 24 and secondly to align the daughterboard 24 to the motherboard 2.

These features may take the form of visual (fiducial) alignment marks or abuttable locating surfaces. Abuttable locating surfaces typically take the form of surfaces of mechanical stops 36 formed on or within the daughterboard 24. It is envisaged that abuttable end stops may also be used as visual alignment features. Visual alignment features may also be formed lithographically by defining thin patterned layers of metallic or other materials.

When defining features using a lithographic process, one of the common sources of fabrication error is the undersizing or oversizing of the in-plane shape of the features.

If fabrication errors are present, typically the pitch between parallel features remains the same, but the features themselves are commonly changed in in-plane dimensions by the same amount. The present invention advantageously uses this effect to form self correcting alignment features that act as reference features for aligning purposes.

The self correcting alignment features of the present invention comprise, on the daughterboard 24, component alignment reference features used to align the optical component 22 to the daughterboard 24 and daughterboard alignment reference features used to align the daughterboard 24 to the motherboard 2.

The component and daughterboard reference features may be formed in the same processing step. In this manner, process variations have a simultaneous effect on both features. If the features are chosen such that both move by the same amount through process variations such as re-sizing or lithographic mask misalignment, then the relative distance between the two features remains the same and the optical alignment between the optical component 22 and the motherboard 2 becomes self-correcting. A shift in position of one of the reference features is compensated for by an equivalent shift in position of the other reference feature.

These reference features therefore allow the optical component 22 to be passively aligned to a specific position on the motherboard 2 where the optical component 22 may, for example, optically link to another optical component 10, 22 such as an integrated optic waveguide 8 formed upon/within the motherboard 2, or another optical component 22 mounted on a daughterboard 24 and integrated in accordance with the present invention.

To accomplish passive alignment, the optical component 22 that is to be mounted on the daughterboard 24 needs to have a lateral reference feature that can be used to align with respect to the component reference feature on the daughterboard 24. The component reference feature on the daughterboard 24 may be a tertiary lateral reference feature 42. The reference feature on the optical component 22 has an accurate position with respect to the output optical path of the optical component 22.

The passive alignment between the daughterboard tertiary lateral reference feature 42 and the lateral reference feature on the optical component 22 may be accomplished optically, such as using one or a number of suitably positioned cameras and/or mechanically where the lateral reference features on the optical component and tertiary lateral reference features 42 on the daughterboard 24 comprise mutually abuttable surfaces.

Similar reference features may also be used to passively align the daughterboard 24 to the motherboard 2. The reference features on the motherboard 2 are primary lateral reference features 28 and may be formed upon or within the motherboard 2 or comprise part of at least one or more walls of a recess 18 formed in the motherboard 2. The reference feature on the daughterboard 24 to which the primary lateral reference feature 28 aligns with may be a secondary lateral reference feature 30.

In one aspect of the present invention, the recess 18 comprises one or more walls acting as one or more primary lateral reference surfaces 28. The primary lateral reference surfaces 28 or walls are operative to serve as visual alignment reference surfaces or mechanical locating surfaces for accurate alignment between optical components 22 intended to be integrated with/on the motherboard 2.

If the recess walls are used as mechanical locating surfaces, the slope of the walls are desirably unaffected by the in-plane shape of the recess 18. When recesses 18 of the present invention comprise walls acting as lateral reference surfaces, there is no need to form extra alignment reference features elsewhere on the motherboard 2, therefore cutting down processing steps and processing time. Reducing the amount of processing steps and necessary features on a motherboard chip minimises the chances of poor production runs resulting from a single faulty step or from sources of error resulting from forming separate alignment features.

FIG. 1a shows an example of a rectangular recess 18 according to this aspect of the present invention where the primary lateral reference surfaces 28 are formed from walls indented inwards from a corner of the rectangle shape. In this example the walls comprising the primary lateral reference surfaces 28 have a small surface area compared to the other recess 18 walls. The small primary lateral reference surfaces 28 therefore minimise unwanted friction between the secondary lateral reference surfaces 30. Similarly the primary lateral reference surface walls may be positioned and sized appropriately so not to interfere with the functioning of the daughterboard-optical components 22, for example not blocking or scratching a delicate optical output facet.

By having primary lateral reference surfaces 28 located on the walls of the recess 18, the present invention removes cumulative sources of alignment inaccuracy resulting from the total amount of different features required in combination to align optical components 22. Each independent alignment feature involved in an integration alignment system may introduce additional sources of alignment error resulting from the physical attributes of each independent feature.

Therefore, in this aspect of the present invention where the walls of the recess 18 comprise the primary lateral reference surfaces 28 the dominant source of alignment error arises from the accuracy in forming the recess 18 at the correct position on the motherboard 2 which is typically between 0 to 2 µm, more typically 0.5 µm. The present invention also minimises the total amount of processing steps and features required to align optical components 22.

In this aspect of the present invention where the recess walls comprise primary lateral reference surfaces 28, the recess 18 is typically formed using an etching process, although it is envisaged that any process forming arbitrary, but precisely defined size and shaped recesses 18 may be used. The etching process typically requires masking an appropriate area of the motherboard chip and subjecting the unmasked areas to an etchant which then etches material to a shape and size corresponding to the mask design, the process characteristics and the time of the etch. One such etch is an inductively coupled plasma (ICP) etch.

Recesses 18 in this aspect of the present invention may be formed of an arbitrary shape giving greater flexibility to integrate a variety of optical components 22 with any arbitrary designed in-plane orientation in the optical assembly 1. By being able to form an arbitrary shaped recess 18, the primary lateral reference surfaces 28 may be as large or as small as required, given the size of the overall recess. Such recesses 18 may equally be used in aspects of the invention where primary lateral reference surfaces 28 are not formed as part of the recess walls.

The advantages of using an etch to form a recess 18 as opposed to milling a recess are numerous. Firstly, etching processes are known to be highly controllable, giving submicron size precision accuracies. The shape and position of the etched recess 18 is typically derived from aligning the mask to sets of alignment marks used to form other integrated features on the motherboard 2. Thus the shape and position of the surfaces of the recess 18 with respect to other integrated features on the motherboard 2 are coordinated accurately to the overall chip design.

Numerous recesses 18 can be simultaneously formed during the same etching run as opposed to forming recesses 18 individually. This also eliminates translational errors that occur in milling processes and aids in wafer scale manufacturing techniques. The combination of accuracy and translational errors in milled recesses makes them not suitable as reference regions for alignment, as the coupling of the light from one optical component 22 to another critically depends upon the accuracy of the optical alignment.

Recesses 18 formed using an etching process are not subject to cracking and chipping from milling tools. A crack may render the chip unusable if the chip breaks or the crack extends to a region with a functional feature such as a waveguide. Milling machines are often located in workshop environments. Etching machines however are more often located in clean room environments in close proximity to other machines and processes used to form other features of the motherboard 2. Thus the duration that the wafer containing the motherboard 2 is kept in a clean environment during its processing life cycle is advantageously lengthened.

A cavity or recess formed by a milling process is limited in size and shape to the size and shape of the milling tool; however a recess 18 of the present invention can have an arbitrary size and shape. For example, cavities created using standard milling processes have rounded internal corners with a radius set by the radius of the milling tool. Rounded internal corners are generally undesirable as they do not provide flat surfaces for other reference surfaces to locate against, and often make the recess larger than it purposefully needs to be. Therefore the milled motherboard chip 2, any waveguide integral to the motherboard chip 2 and any integrated optical components 22 located in the recess 18 have to be designed in respect of the rounded features. This forces a non-optimum layout of waveguides 8 and alignment reference regions and an increased number of processing steps.

An example of an extra processing step in US2003/0091262 is the formation of separate lateral alignment stops located on top of the motherboard. Making larger recesses than are actually needed also makes the milled motherboards structurally weaker due to the increased amount of material removed during the milling process.

The recess 18 of the present invention can be optimised not only to a shape that provides surfaces suitable for optical alignment references regions but also to other requirements of an optical assembly 1. These other requirements may include having as small a recess 18 as possible to allow integrated optic waveguides 8 to pass around the recess 18 using the shortest optical path and/or to have angled corners in the recess 18 suitable for butting up corners of other sub-assemblies or other reference stops. The primary lateral reference surfaces 28 in all the aspects of this invention may be formed below the top surface of the motherboard 2 such as part of one or more recess walls or as part of a lithographically defined layer within the motherboard 2. Therefore, in contrast to the prior art where alignment stops are formed on top of the motherboard, the top surface of the motherboard 2 immediately surrounding the recess 18 in the present invention may be made devoid of mechanical alignment features such as stops and may therefore be used to form a hermetic seal between the daughterboard 24 and motherboard 2 in a simple manner unaffected by local features on the motherboard surface.

Hermetic sealing is often required to protect delicate optical components 22 to working environments that may damage its performance or longevity. Hermetic sealing 'on chip' of the integrated optical components 22 is advantageous in that it alleviates or removes entirely the need to further package the optical assembly 1 for use. Furthermore, having the hermetic seal between the daughterboard 24 and motherboard 2 of the present invention, entails that no further encapsulating feature, such as a sealing over-cap, is required to hermetically seal the optical components 22 mounted on the daughterboard 24.

Figure 17A:
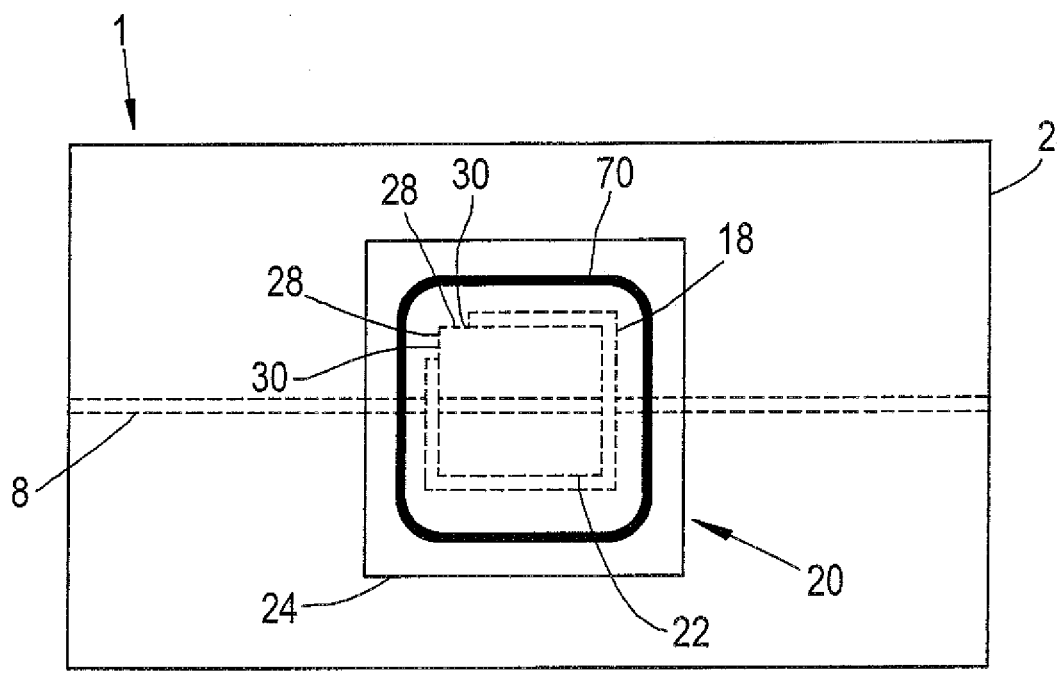
FIGS. 17a and 17b show respective plan and end-on views of a sub assembly integrated with a motherboard, together forming a hermetic seal with an unbroken ring of material.
Figure 17B:
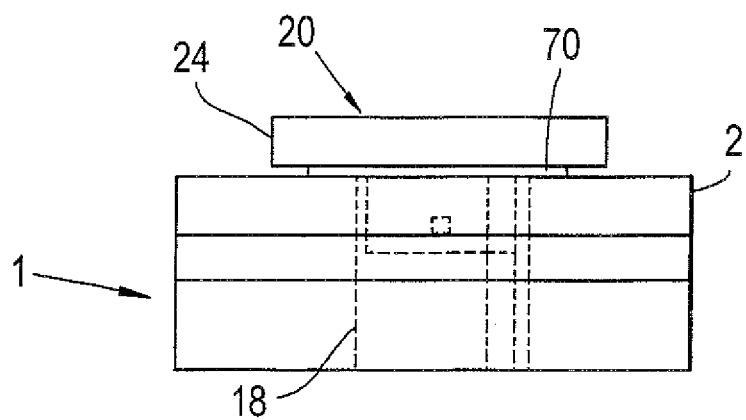

As shown in FIGS. 17a and 17b, such a seal may be made by forming an unbroken ring 70 of sealing material between the daughterboard 24 and motherboard 2 when the daughterboard 24 is mounted in position on the motherboard 2. Sealing materials are typically metallic solders such as gold-tin solder, but may in principle be any suitable sealing material such as an epoxy. Typically, as shown in FIG. 17 when using a metallic solder as the sealing material, an unbroken ring of metallic solder is deposited and patterned around the recess of the motherboard 2 and a further equivalently sized/shaped unbroken ring of metallic solder is similarly formed on the daughterboard 24. The daughterboard 24 is then placed into its final position on the motherboard 2, and the solder is then reflowed by applying thermal/laser or other heat based treatment allowing the solder rings on the motherboard 2 and daughterboard 24 to bond into a single unbroken ring 70 of sealing material. After reflow, the solder cools encapsulating the recess. The surface of the motherboard 2 and/or the daughterboard 24 may have features to locate the sealing material.

If the recess 18 is not formed all the way through the motherboard 2 (a 'blind' recess), and the integrated optical component 22 optically links to an integrated optical waveguide 8 on the motherboard 2, then total encapsulation of the integrated optical component 22 may take place in one bonding step. This is in contrast to that disclosed in U.S. Pat. No. 6,786,645 which requires multiple steps to hermetically seal the cavity, giving greater complexity to the fabrication procedure, increasing production costs and the chances for a poorer yield of working optical assemblies.

The following are illustrative examples of the present invention. The features in each example, where appropriate, are intended to be combinable with features in other examples of this invention.

1st Example

Figure 1B:
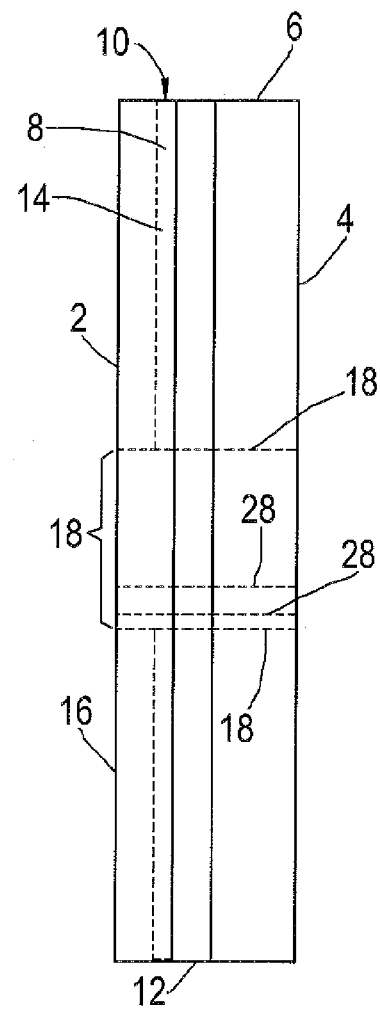
Figure 1C:
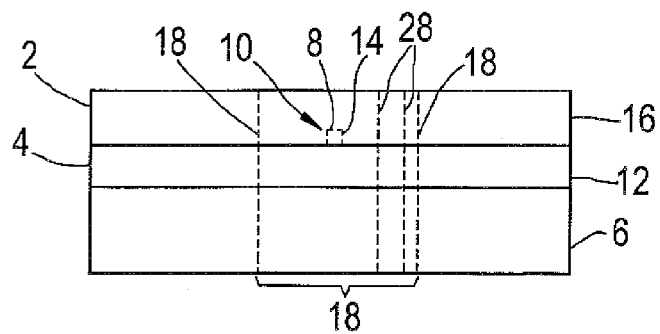

One illustrative example of the present invention is shown in FIGS. 1 to 3. In this example, as shown in FIGS. 1a to 1c, the motherboard 2 comprises a layered structure 4 based on a silicon substrate 6. On top of the silicon substrate 6 are deposited successive layers of silica, grown and patterned to form buried channel passive integrated optic waveguides 8. These passive waveguides 8 form a primary or 'motherboard' optical component 10. The silica layers are typically a silica undercladding layer 12 formed within and upon the surfaces of the substrate 6 by thermal oxidation, a core layer 14 and an overcladding layer 16. The core silica layer 14 is of increased refractive index to the cladding layers and is patterned to form a rectangular waveguide cross section. Although this example describes one method of forming integrated optic waveguides 8 on the motherboard 2, a person skilled in the art of waveguide 8 technology will appreciate that, in principle, any type of active and/or passive integrated optic waveguide 8 may be formed on the motherboard 2 and that other substrate materials may be used, for example silica or polymer based materials.

A recess 18 is then formed through or partially through the motherboard 2 cutting through the waveguides 8 intended to be coupled to the optical component 22 on the daughterboard 24. It is envisaged that in some situations the recess 18 may not actually cut through core material of a waveguide 8 as certain mode matching tapering techniques utilise alternate segments of core and cladding layers to expand the mode size of the integrated optic waveguide 8. A recess 18 formed all the way through the layered structure 4 advantageously allows the sub-assembly 20 to be thermally and/or electrically contacted or optically accessed via this hole. This gives the optical assembly 1 increased flexibility in its design and manufacture and provides a means to let unwanted heat dissipate away from an integrated active chip 22.

A sub-assembly 20 is then formed by securely mounting a daughterboard-optical component 22 onto a daughterboard 24. The daughterboard 24 is typically a silicon substrate, often with other layers of dielectric and/or metallic material. The other material layers on the daughterboard 24 may be patterned to form functional features such as insulating layers, out-of-plane alignment reference stops, bonding and electrical contact regions.

Figure 2A:
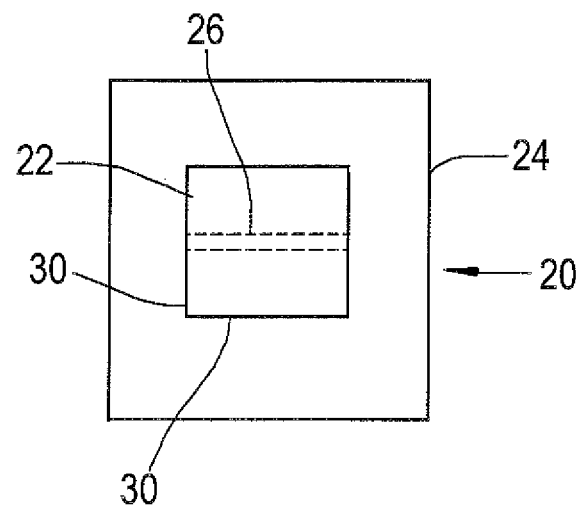
FIGS. 2a to 2c show the respective plan, end-on and side views of a sub-assembly of the present invention.
Figure 2B:
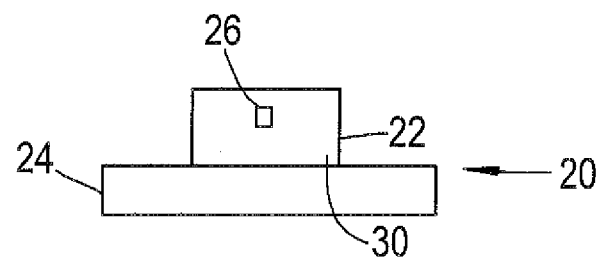
Figure 2C:
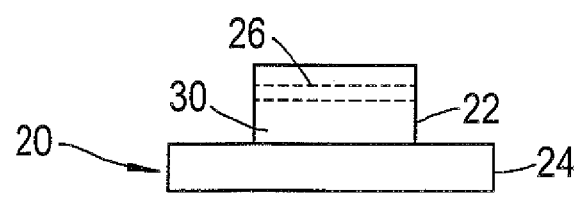
Figure 4:
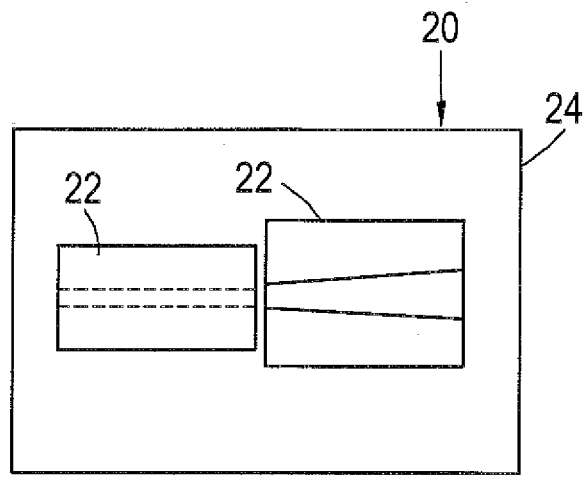
FIG. 4 shows the plan view of a further example of a sub-assembly of the present invention comprising two mounted daughterboard optical components.

Optical components 22 that may be integrated include optic amplifiers such as semiconductor optical amplifiers, integrated optic modulators, isolators, thin film filters, lenses and other separately formed active or passive integrated optic waveguide 8 devices. As shown in FIG. 4, there may be one or more daughterboard-optical components 22 mounted on the daughterboard 24 or a single daughterboard-optical component 22 performing multiple functions such as a monolithically integrated electro-absorption modulator and semiconductor optical amplifier (EAM SOA). FIGS. 2a to 2c show an example of a sub-assembly 20 where the daughterboard-optical component 22 comprises a buried channel integrated optic waveguide 26.

The recess 18 has an in-plane shape specifically designed to provide one or more accurate primary lateral reference surfaces 28. These reference surfaces form part of the recess 18 walls. The recess 18 also has other specific functions including providing a hole deep enough to accommodate the daughterboard-optical component 22 such that the optical paths of the motherboard integrated optic component 8 and the daughterboard-optical component 22 may vertically align in an out-of-plane direction.

In this example, shown in FIGS. 3a to 3c, the width of the daughterboard 24 is larger in at least one in-plane direction than the corresponding width of the recess 18. This is to allow the sub-assembly 20 to be inverted and mounted (flip-chip mounted) onto the recess 18 such that the daughterboard-optical component 22 extends from the daughterboard 24 at least partially into the recess 18. A region of the exposed daughterboard 24 surface, or a feature surface, patterned on the daughterboard 24 engages with an out-of-plane reference region on top of the overcladding layer 16 on the motherboard 2. These engaging regions are tailored to provide out-of plane optical alignment between the optical components 8, 22. In principle, any feature or technique facilitating out-of-plane alignment between a sub-assembly 20 carrying a daughterboard-optical component 22 and a motherboard 2 comprising a motherboard optical component 10, 8 may be used.

In this first example as shown in FIGS. 3a to 3c, one or more exposed side surfaces of the daughterboard-optical component 22 are used to provide one or more lateral optical alignment reference surfaces referred to as secondary lateral reference surfaces 30. These reference surfaces therefore directly correspond to the position of the daughterboard-optical component 22. In this example, a variation in position of the daughterboard-optical component 22 on the daughterboard 24 therefore does not affect the operation of the secondary lateral reference surface 30. The procedure of mounting the daughterboard-optical component 22 onto the daughterboard 24 is therefore not alignment critical and becomes a simpler and quicker step to perform.

In other illustrative examples of this invention the secondary lateral reference surfaces 30 may be located on other parts of the sub-assembly 20 such as on the daughterboard 24. In principle, any number of secondary lateral reference surfaces 30 on any feature of the sub-assembly 20 may be used in isolation or in combination to provide the required optical alignment reference surfaces.

Once the sub-assembly 20 is flip chipped onto the recess region, lateral optical alignment is accomplished when the secondary lateral reference surfaces 30 of the daughterboard-optical component 22 are located against the primary lateral reference surfaces 28 of the recess 18 to provide the lateral optical alignment. By simply manoeuvring the sub-assembly 20 in the recess 18 until the secondary lateral reference surfaces 30 engage against the corresponding primary lateral reference surfaces 28, the motherboard 2 and daughterboard-optical components 22 are passively aligned without the need to optically monitor the optical coupling of the two optical components in real time. Although the invention enables passive alignment, active alignment techniques of two optical components may also be used in conjunction.

Preferably, as shown in FIGS. 1a and 3a, two orthogonal secondary lateral reference surfaces 30 of the daughterboard-optical component 22 are located against complementary orthogonal surfaces of the recess 18 to provide two-dimensional lateral optical alignment. Daughterboard-optical components 22 typically take the form of one or more individual chips with rectangular plan and cross sectional shapes. The references surfaces of the daughterboard-optical component 22 are therefore often perpendicular to the plane of the motherboard 2 when flip-chip integrated. It is therefore desirable that the reference surfaces on the board recess 18 be perpendicular to the plane of the motherboard 2 to permit maximum surface area contact between the primary 28 and secondary 30 lateral reference surfaces.

2nd Example

Figure 5A:
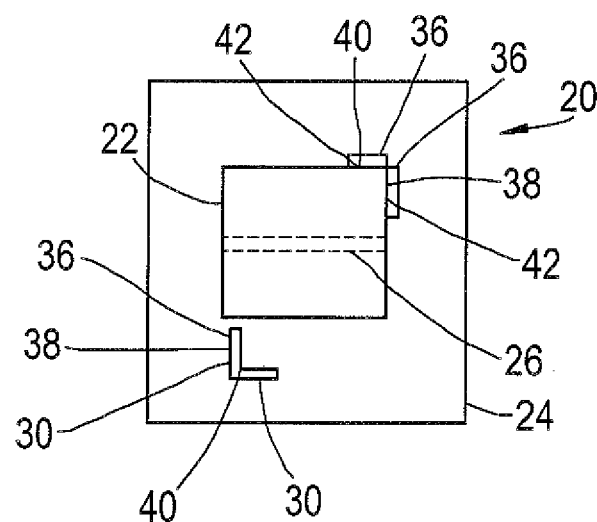
FIGS. 5a and 5b show the respective plan and end-on views of a further example of a sub-assembly of the present invention comprising stops.
Figure 5B:
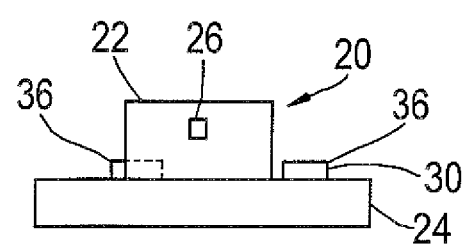

Further to the first example is a second example of the present invention described as follows and shown in FIGS. 5 to 7. In this second example, the daughterboard 24 referred to in the first example comprises self-correcting alignment features. These features comprise one or more stops 36 formed on the daughterboard 24 as shown in FIGS. 5a and 5b.

Stops 36 are usually formed from selectively removing part of a layer to leave the desired residual features upstanding from the bottom of the removed part of the said layer. In this invention, the stops 36 are made using a precision etching process such as an ICP etching process, however it is envisaged that other forms of stops 36 may also be used such as patterned polymer stops. The stops 36 of the present invention are solid locating features patterned and processed so that they protrude from at least one surrounding local surface. They may take the form of rectangular or other suitably shaped blocks.

The stops 36 in the present invention provide one or more sets 38, 40 of reference surfaces formed in a simultaneous processing step. Each reference surface set 38, 40 comprises a secondary lateral reference surface 30 used to locate the daughterboard 24 to the primary lateral reference surface 28 of the recess, and a tertiary lateral reference surface 42. A reference surface of the daughterboard-optical component 22 is located against the tertiary lateral reference surface 42.

Figure 6A:
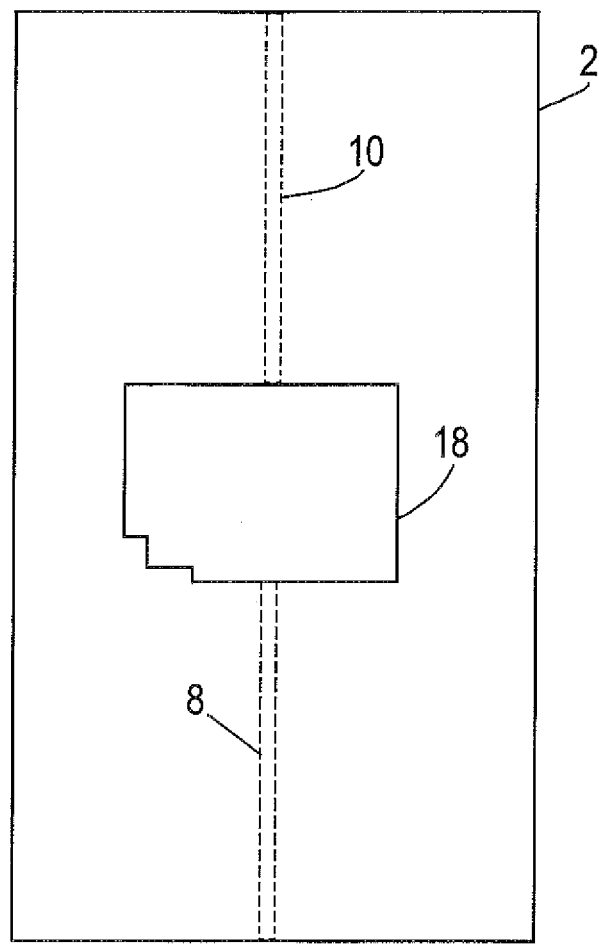
FIG. 6a shows a motherboard of the present invention operative to integrate the sub-assembly of FIG. 5.

The recess 18 of the motherboard 2 shown in FIG. 6a is specifically designed and manufactured to give primary lateral reference surfaces 28 suitable for the secondary lateral reference surfaces 30 to locate against. Because in this example a stop 36 is used to locate against the primary lateral reference surface 28 rather than part of the daughterboard-optical component 22, damage to the daughterboard-optical component 22 is minimised during the formation of the assembly 1 when the sub-assembly 20 is being moved into alignment.

Figure 6B:
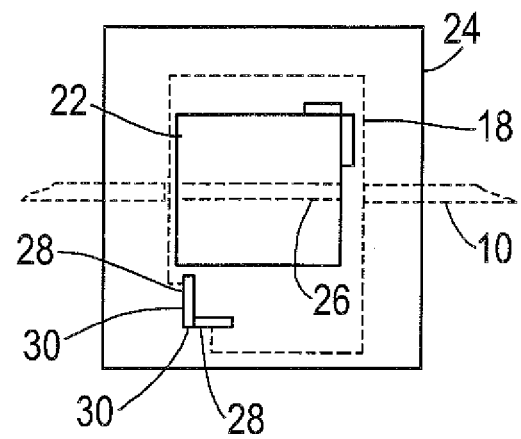
FIG. 6b shows the integrated positions of the recess and optical waveguides of the motherboard of FIG. 6a with respect to the sub assembly of FIG. 5.

FIG. 6b shows the situation where the sub-assembly 20 and the motherboard 2 are flip-chip integrated. Optical alignment occurs when both secondary lateral reference surfaces 30 and tertiary lateral reference surfaces 42 are properly located against their respective complementary reference surfaces.

The secondary 30 and tertiary lateral reference 42 surfaces in each set 38, 40 are parallel and face the same direction. Therefore fabrication variations, such as in the overall positions of the stops 36 on the daughterboard 24 or under/over etching of the stops do not affect the alignment of the optical component 22 as the stops 36 are self correcting in nature. The alignment of the optical component 22 is therefore defined precisely relative to the reference surfaces used to align the daughterboard 24 to the motherboard 2. The positional accuracy between the secondary 30 and tertiary 42 lateral reference surfaces is typically between 0 to 50 nanometers, more typically 20 nanometers.

A fabrication variation in the stop 36 comprising the tertiary lateral reference surface 42 is compensated for by the equivalent fabrication variation in the stop 36 comprising the secondary lateral reference surface 30. Such variations are exemplified in FIGS. 7a to 7c. In each case, the relative distance between the secondary 30 and tertiary 42 lateral reference surfaces remains the same with the introduction of fabrication variations. As such the integration process becomes self-correcting.

Figure 7A:
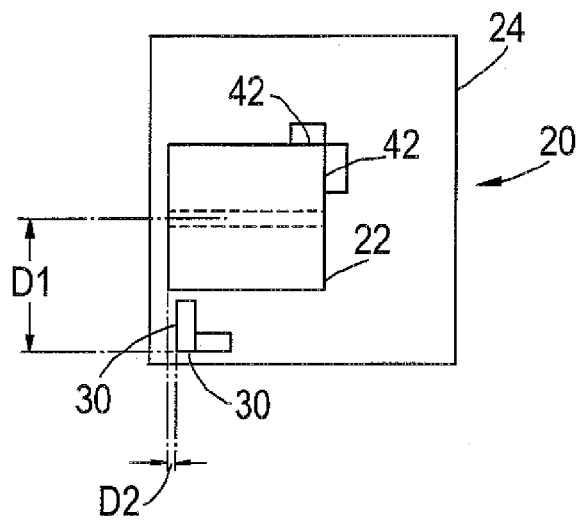
FIGS. 7a to 7c show variations in the location of the stops and daughterboard optical component on the daughterboard of the sub assembly of FIG. 5.

FIG. 7a shows a sub-assembly 20 where; D1 is the distance between the lateral centre axis of the daughterboard-optical component 22 waveguide 8 and the secondary lateral reference surface 30 of reference set 40; and D2 is the distance between an end facet of the daughterboard-optical component 22 and the secondary lateral reference surface 30 of reference set 38. The precision of distances D1 and D2 are critical to the optical alignment as the optical assembly 1 uses the secondary lateral reference surfaces 30 of the sub-assembly 20 to locate against the primary lateral reference lateral reference surface 28 of the motherboard 2.

Figure 7B:
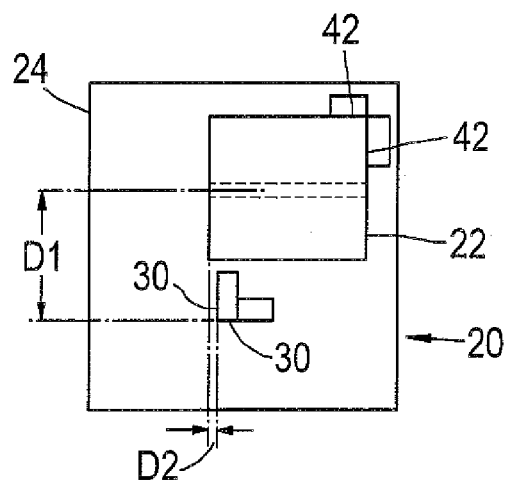

FIG. 7b shows a situation where the stops 36 have been deliberately or accidentally fabricated at different locations on the daughterboard 24. Because the stops 36 are formed in the same fabrication step, the relative positions between the secondary lateral reference 30 and tertiary lateral reference surfaces 42 in each reference set 38, 40 are maintained. Thus the absolute distances D1 and D2 are unchanged from the sub-assembly 20 depicted in FIG. 7a.

Figure 7C:
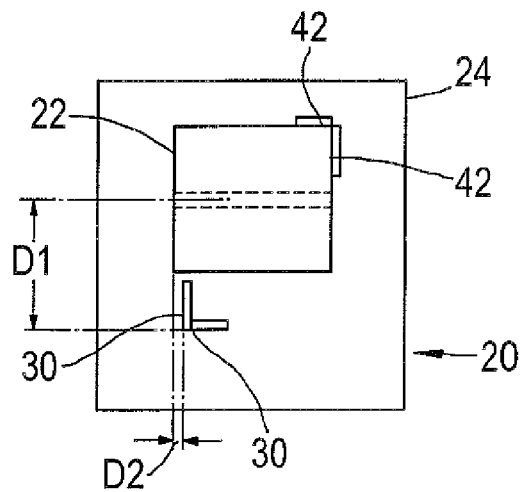

FIG. 7c shows yet another situation where the stops 36 have been undersized in the fabrication process. Because the stops 36 are manufactured in the same process and the secondary lateral reference 30 and tertiary lateral reference surfaces 42 in each set face the same direction, the resulting secondary lateral reference 30 and tertiary lateral reference surfaces 42 have moved in the same direction by the same distance. The relative movement of these reference surfaces is therefore zero and the distances D1 and D2 are again the same as FIG. 7a.

Provided the optical component 22 is located against the tertiary lateral reference surface 42, the secondary lateral reference surface 30 directly corresponds to the position of the optical component 22, regardless of its actual mounted position on the daughterboard 24. Multiple sets of surfaces may be used for one dimensional lateral optical alignment or two dimensional lateral optical alignment. It is envisaged that any number of stops 36 may be used to provide the required reference surfaces. The specific design of the stops 36 in this example makes the sub-assemblies 20 more tolerant to fabrication variations.

3rd Example

Further to the previous examples is a third example of the present invention where a daughterboard mounted optical component 22 is integrated to a motherboard 2 and optically linked to integrated optic waveguides 8 formed on the motherboard. The daughterboard 24 in this example is similar to that described in the 2nd example by the fact that the daughterboard 24 comprises self correcting alignment features in the form of secondary 30 and tertiary 42 lateral reference surfaces on simultaneously fabricated mechanical stops.

In contrast to the second example where alignment occurs through contact of the secondary reference surfaces 30 with primary reference surfaces 28 on the motherboard recess 18, in this third example the primary lateral reference surfaces 28 of the motherboard 2 and secondary lateral reference surfaces 30 of the daughterboard 24 are used as visual reference markers in visual alignment using an optical alignment tool. The reference markers may be the lateral reference surfaces or an apex joining two such surfaces. Such an optical alignment tool may be a die bonding tool facilitating optical alignment by overlaying images of the daughterboard 24 and the motherboard 2. One such tool is the Fineplacer™ Lambda made by Finetech.

The primary lateral reference surfaces 28 in this example maybe formed in the same processing steps as those used to lithographically pattern and form the motherboard waveguides 8. In this manner the primary lateral reference surfaces 28 directly correspond to the position of the motherboard waveguides 8 and are located within the motherboard 2. Positional deviations of the motherboard waveguides 8 about the motherboard 2 resulting from processing errors such as lithographic mask misalignment will also correspondingly affect the position of the primary lateral reference surfaces 28. As such, the primary lateral reference surfaces 28 are also self-correcting with respect to the position of the motherboard waveguides 8, thus the relative distances between the two remain the same.

Once the daughterboard optical component 22 is mechanically located to the tertiary lateral reference surfaces 42 of the daughterboard 24, the daughterboard 24 is then flip-chipped into the motherboard recess 18. The daughterboard 24 is then optically aligned to the motherboard 2 by visual comparison of the primary 28 and secondary lateral reference surfaces 30 viewed under the optical alignment tool.

Alternatively, the secondary 30 and tertiary 42 lateral reference surfaces may be formed as: one or more thin marker layers on top of the daughterboard 24; recesses into the daughterboard 24 or as features of one or more lithographically defined layers within the daughterboard 24 similar to the primary lateral reference surfaces 28 formed in the motherboard 2. Where thin marker layers are used, the lateral reference surfaces may comprise one or more of the peripheral edges of the marker. In such an alternative the optical component 22 is optically aligned to the daughterboard 24 by visual comparison of the tertiary lateral reference surfaces 42 and the optical component reference surface viewed under a suitable optical alignment tool.

Figure 16A:
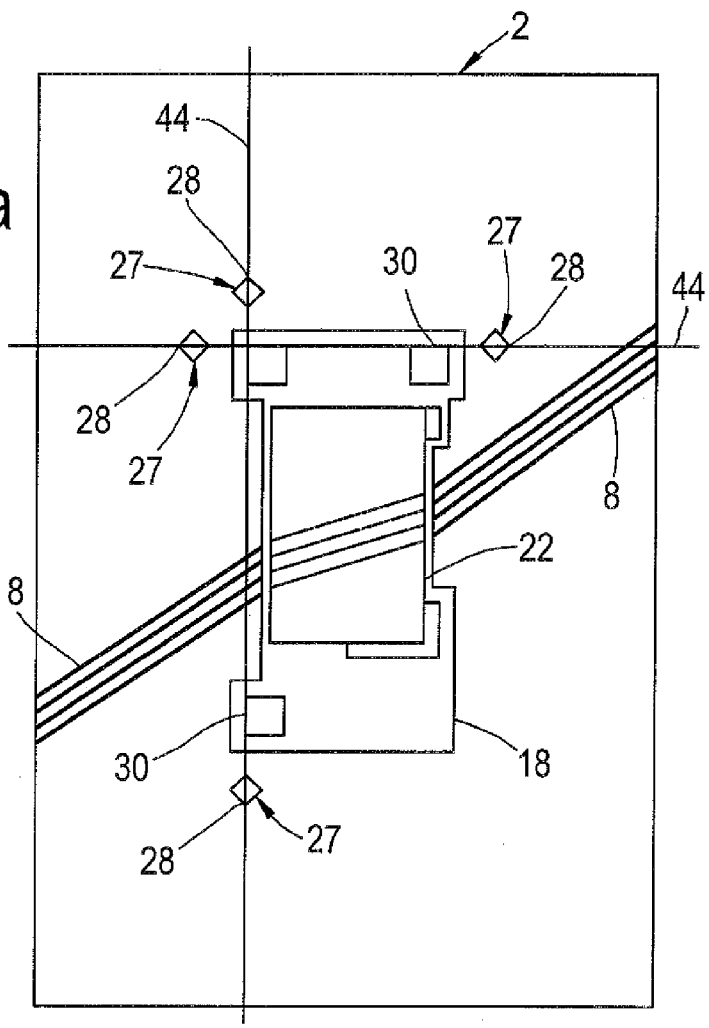
FIG. 16a shows optical alignment of an optical assembly utilising visual alignment features.

FIG. 16*a* illustratively shows an example of the alignment features used in this 3rd example of the present invention. The alignment features on the motherboard (motherboard alignment features 27) comprise sets of primary lateral reference surfaces 28 acting as points or marks upon which lines 44 may be superimposed on the overlaid images on the display screen of the alignment tool. Once the lines 44 are in place, the daughterboard 24 is then passively aligned by visually locating the daughterboard secondary lateral reference surfaces 30 up to the superimposed lines.

If the motherboard alignment features 27 are formed of the same material and in the same processing steps as the waveguides 8, the primary lateral reference surfaces 28 may be difficult to see since the core layer defining the motherboard waveguides 8 is typically of a low refractive index contrast to that of the surrounding cladding material 12, 16.

To further improve the visibility of the motherboard alignment features 27 comprising the primary lateral reference surfaces 28, a thin (in order of nanometers) top covering 46 may be applied directly over and directly corresponding to the shape of the motherboard alignment features 27. Such a top covering 46 may be a metallic layer or one or more other thin material layers 46, such as silicon, that is visually identifiable when using the optical alignment tool.

The layer is disposed directly on top of the motherboard alignment feature 27 so that when the waveguides and motherboard alignment features are overclad, the visible material layer 46 is sandwiched between the top of the motherboard alignment feature 27 and the overcladding layer 16. By having the visible layer directly on top of the motherboard alignment feature 27 instead of on top of the overcladding layer 16, subsequent optical alignment does not suffer from any hindering optical effects resulting from the different height levels of the waveguides 8 and visible layer 46.

Figure 16B:
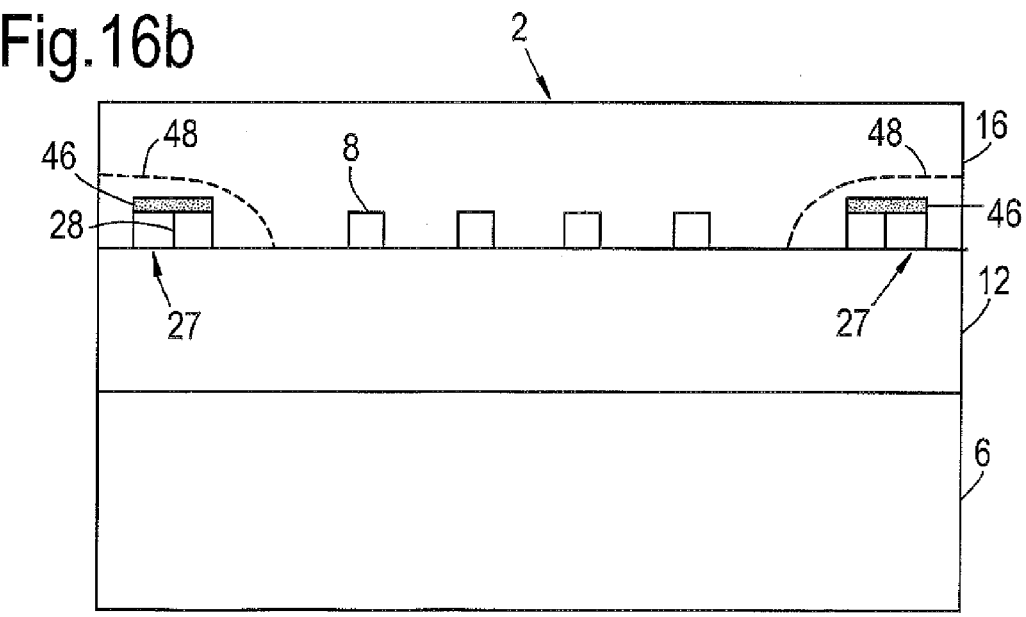
FIG. 16b shows the motherboard alignment features capped with visible layers.

One method of forming this visible layer 46 is to use an existing metallic layer nominally used temporarily in the fabrication process to lithographically define the core layer. This process can be shown in FIG. 16*b*.

The initial stages of motherboard 2 fabrication typically involve depositing and patterning a metal mask layer for etching the motherboard waveguides 8. Nominally the metal mask layer is removed before overcladding the patterned waveguides 8. Before the metal is removed, the present invention deposits a layer of resist material 48 over the metal capped core features and patterns the resist layer 48 to leave the waveguides 8 exposed whilst the motherboard alignment features 27 are protected by the resist layer. The metal is then removed from the core layer waveguides 8 and not the motherboard alignment features 27. The protective photo resist layer 48 is then removed and the further fabrication steps carry on as normal.

The only additional step in forming the visible layer is the application of a protective resist layer. The motherboard alignment features 27 may be well separated from the waveguides 8 and as such there is no need to use expensive finely detailed lithographic mask plates to pattern the protective resist layer 48. Therefore the visual layer may be formed simply and cheaply. Additionally or alternatively, the visual layer may be formed underneath and/or around the sides of the motherboard alignment features 27 using processing steps known in the art.

A benefit from this alignment scheme is that the dominant error in aligning the optical component 22 to the waveguides 8 arises solely from the inaccuracy of positioning the daughterboard 24 visually using the optical alignment tool which is estimated to typically be 0 to 1 μm, more typically 250 nanometers. Errors in relative positions between alignment features on the daughterboard 24 are otherwise reduced to a typical accuracy of 0-50 nanometers, more typically 20 nanometers, as they are defined in the same process steps.

Furthermore, the errors in relative positions between the alignment features 27 and the waveguides 8 on the motherboard 2 are also reduced to a typical accuracy of 0-50 nanometers, more typically 20 nanometers, as they are defined in the same process steps.

4th Example

Figure 8A:
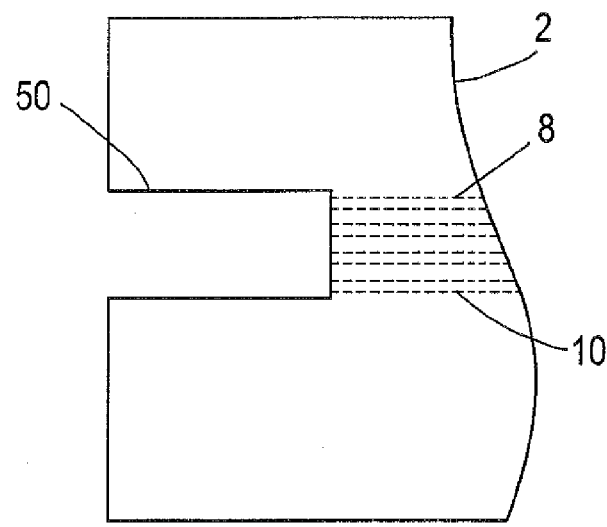
FIG. 8a shows a motherboard of the present invention comprising a recess at an end of the chip.

Further to the previous examples is a fourth example of the present invention described as follows and depicted in FIGS. 8 and 9. The recess 18 in this example is a rectangular shaped slot 50 formed at the edge of the motherboard 2 and is adapted to receive a daughterboard 24 carrying an array of input/output optical fibres 52 to the optical assembly 1. The motherboard 2 in this example has passive integrated optical waveguides 8 arranged to couple end on to the optical fibres securely mounted on the daughterboard 24 of the sub-assembly 20.

Figure 8B:
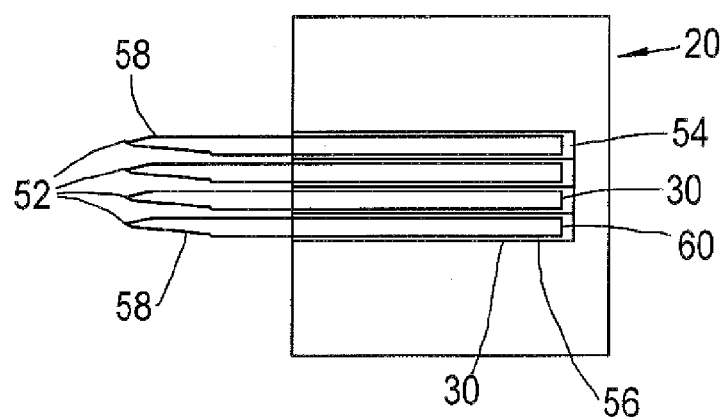
Figure 8C:
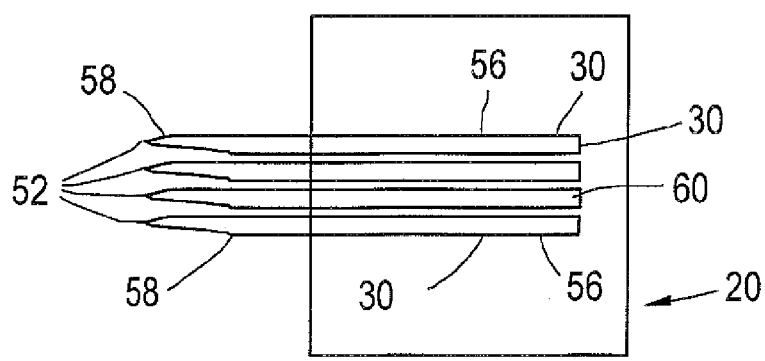
Figure 9:
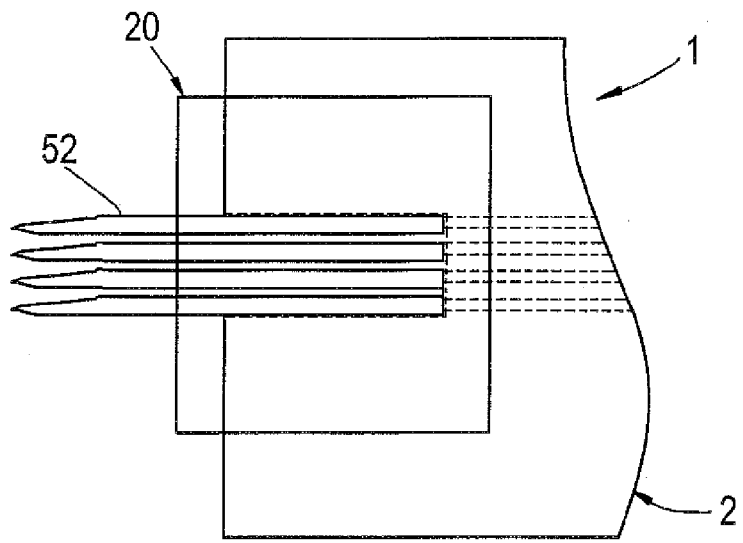
FIG. 9 shows the integration of the motherboard of FIG. 8a with the sub assembly of FIG. 8c.

The array of optical fibres may be mounted directly on the daughterboard 24 as shown in FIG. 8*c* or with the aid of other alignment mechanisms as shown in FIG. 8*b* such as V-grooves 54. In either mounting configuration, the core of each optical fibre sits above the plane of the daughterboard 24. When the sub-assembly 20 is flip-chip mounted into the slot as shown in FIG. 9, the optical fibres align out-of plane to the integrated waveguides 8. The height alignment of the motherboard 2 and daughterboard-optical components 22 is typically facilitated by forming stops, depressions or raised features on the daughterboard 24 and/or the motherboard 2. The peripheral edges 56 of the outer fibres 58 in the array and the end facets 60 of the optical fibres themselves form the secondary lateral reference surfaces 30.

Figure 10A:
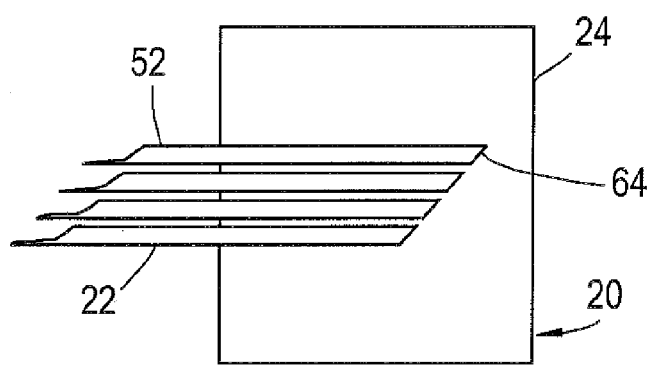
Figure 10B:
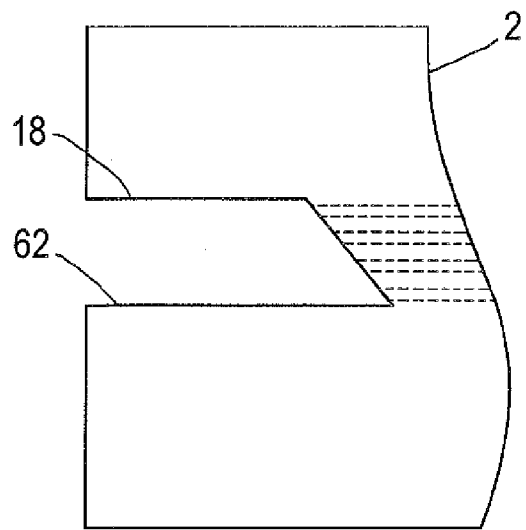

In a further variation on this fourth example, as shown in FIGS. 10*a* and 10*b*, the in-plane shape of the recess 18 may be a trapezium 62 adapted to accept an array of fibres with angled facets 64. Optical components with angled facets are often desirable to reduce the amount of unwanted back reflection at the optical interface. The fibres are distributed on the daughterboard 24 such that the exposed angled facet of each fibre is coincident and flush with the facets of the adjacent fibres.

The parallelogram recess 18 has an in-plane shape with corner angles corresponding to the angle of the fibre facets and the longitudinal direction of the fibre array.

It is envisaged that alternative shaped slots at the end of the motherboard 2 may be used to integrate and optically align the sub-assembly 20.

5th Example

Figure 11A:
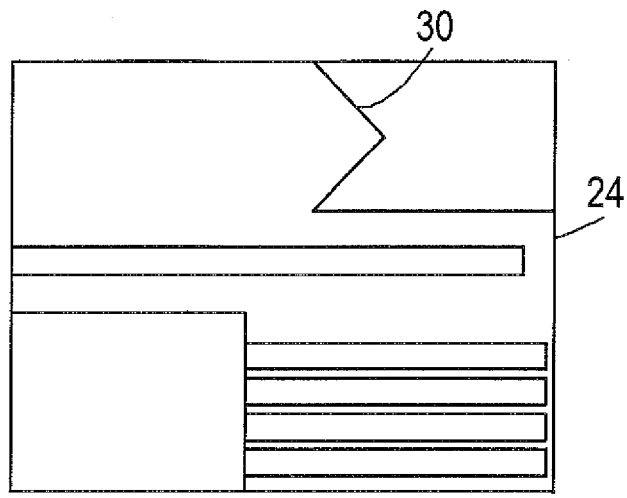
FIG. 11a shows a daughterboard of a sub assembly of the present invention adapted to carry an array of optical fibres.
Figure 11B:
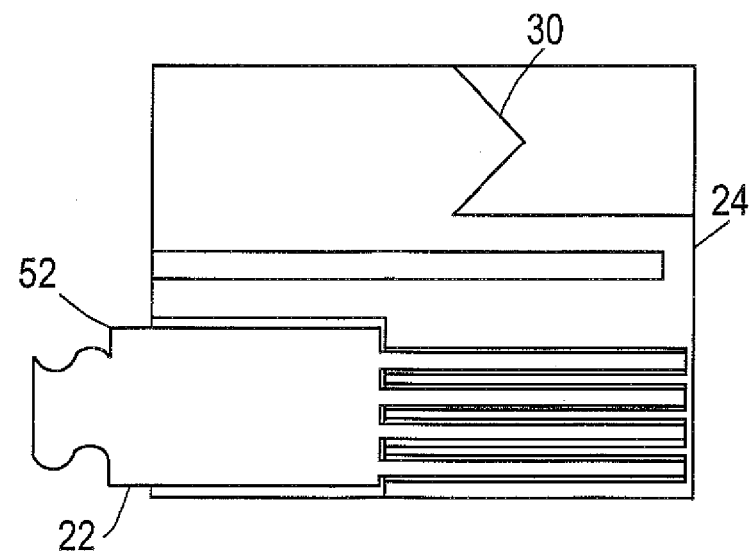

Further to the previous examples is a fifth example of the present invention described as follows and shown in FIGS. 11 to 13. Similarly to the fourth example, the recess 18 in the fifth example, shown in FIGS. 13*a* and 13*b*, is a slot 50 formed at the edge of the motherboard 2 with an in-plane shape providing primary lateral reference surfaces 28. The recess 18 in this fifth example comprises groups of primary lateral reference surfaces 28 where each set or group is adapted to locate against one or more secondary lateral reference surfaces 30 of different sub-assemblies. This can be accomplished as the recess 18 of the invention may take any desired in-plane shape. The primary lateral reference surfaces 28 used to optically align each different sub-assembly 20 form part of a primary lateral reference surface group specific to that particular sub-assembly 20. Different primary lateral reference surface sets may share common primary lateral reference surfaces 28.

An example of such a recess 18 is shown in FIGS. 13*a* and 13*b*. This recess 18 provides a primary lateral reference surface 28 angled in-plane to integrate a sub-assembly 20 of optical fibres where the daughterboard 24 of the sub-assembly 20 comprises an arrow shaped locating section acting as a secondary lateral reference surface 30. The arrow shaped locating section in this example may be formed by etching a shallow depression into the daughterboard 24 of the sub-assembly 20 as shown in FIGS. 12*a* and 12*b*, or may be formed by etching a recess 18 with a similar arrow shaped section all the way through the daughterboard 24.

Figure 12A:
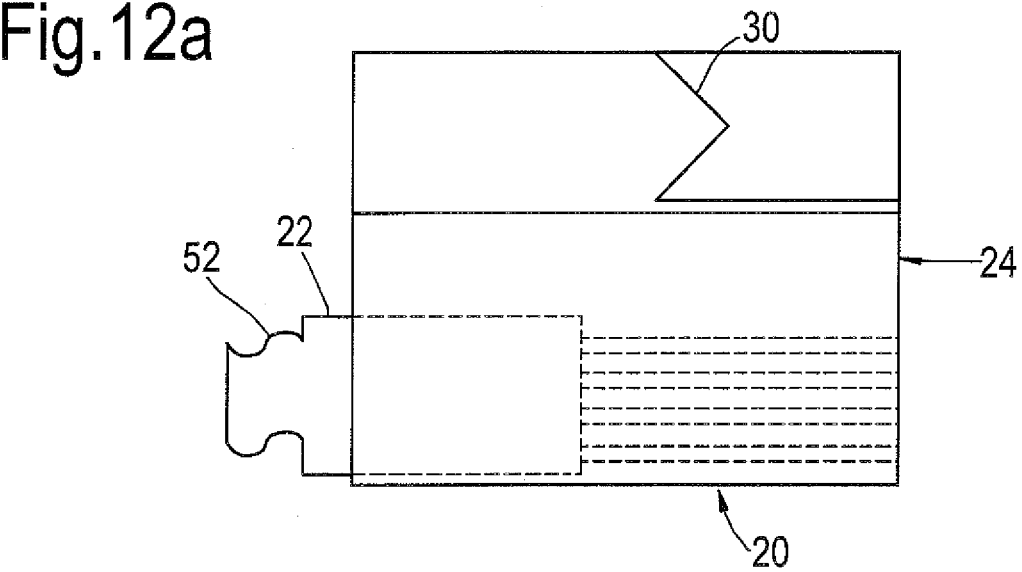
FIGS. 12a and 12b respectively show the plan and end-on views of the sub assembly of FIG. 11b further comprising a block on top of the fibres.
Figure 12B:
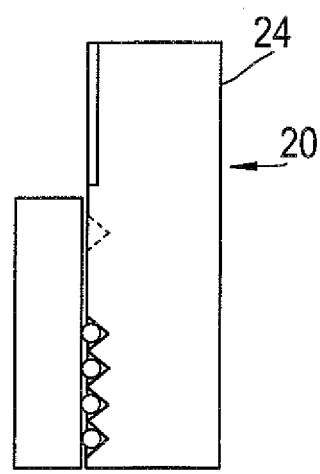
Figure 13A:
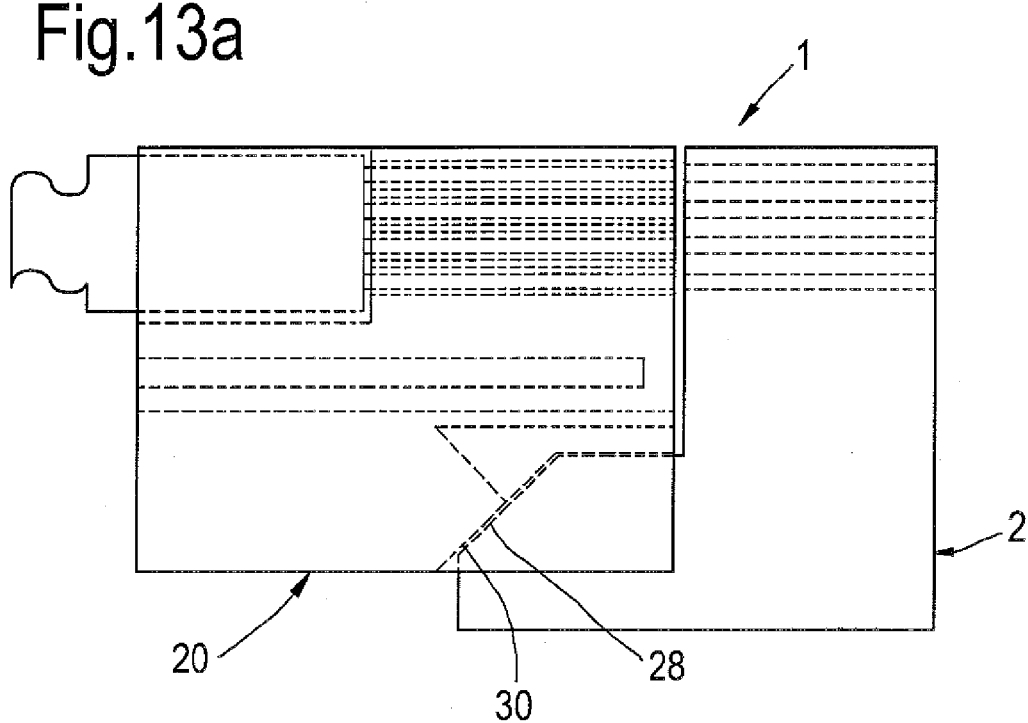
FIG. 13a shows the sub assembly of FIGS. 12a and 12b integrated with a motherboard of the present invention.
Figure 13B:
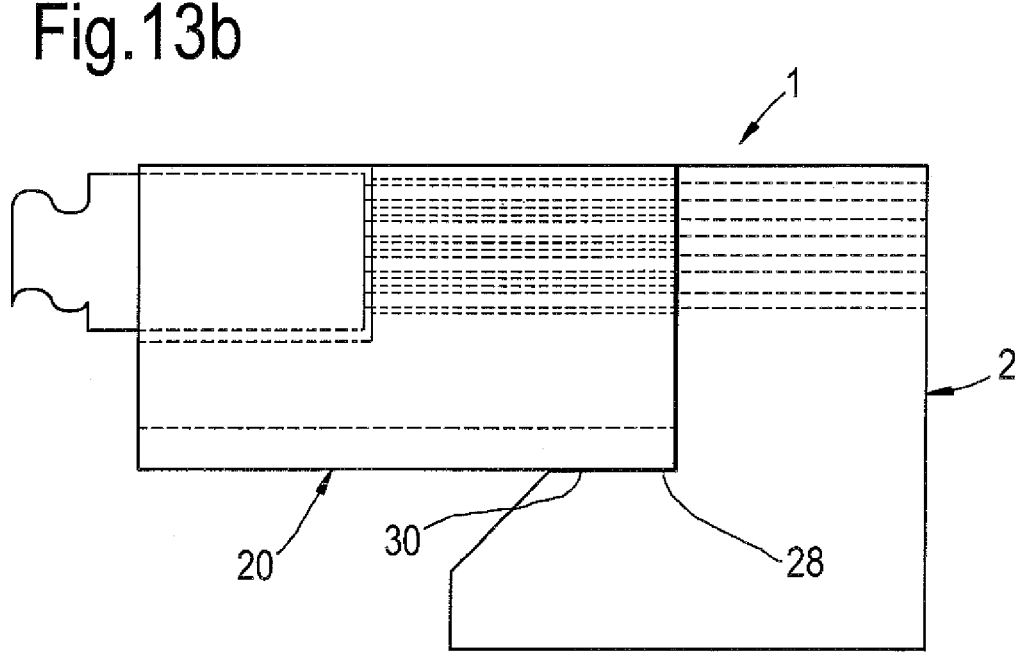
FIG. 13b shows another sub assembly carrying optical fibres integrated with the same motherboard of FIG. 13a FIG. 14a shows a motherboard of the present invention with two recesses.

Such a sub-assembly 20 as shown in FIGS. 12*a* and 12*b* may include other features such as one or more trenches to introduce or allow excess adhesives escape, V grooves to locate the optical fibres on the daughterboard 24 and cover slips/blocks that form a third interface securing the fibres to the daughterboard 24 of the sub-assembly 20.

The recess 18 also comprises primary lateral reference surfaces adapted to accept a rectangular sub-assembly 20 of optical fibres mounted on a rectangular block. Rectangular sub-assemblies 20 comprising arrays of optical fibres are commonly used in the art. Having a multifunctional recess 18 adapted to integrate and optically align a variety of sub-assemblies 20 allows the motherboard 2 to act as a generic integration platform.

Such a platform can then be used for a plurality of different types of optical assembly 1. This is advantageous, for example, in situations where a customer wants to integrate standard fibre clips (such as those in FIG. 13*b*) on a certain number of the optical assemblies 1 fabricated in a manufacturing run and more specialised fibre clips (such as those shown in FIG. 13*a*) on the rest of the assemblies 1 in the same run. In this situation a single type of motherboard 2 is used for both types of eventual optical assembly 1 and eliminates the need for multiple production runs for different motherboard 2 types.

It is also advantageous in production circumstances where there is a shortage of a particular sub-assembly 20 for example when encountering problems in manufacturing the sub-assembly 20 or where the particular type of sub-assembly 20 can no longer be sourced from a preferred supplier. A motherboard 2 with recesses shaped to accommodate sub-assemblies 20 from alternative suppliers would be able to integrate these alternative sub-assemblies 20 without a redesign of the motherboard 2. Furthermore, by having a recess 18 adapted to receive and optically align a multitude of similar sub-assemblies 20, designing of the motherboard 2 may be finalised before it is decided which particular sub-assembly 20 to use in the final assembly 1. Such flexibility allows for rapid prototyping.

It is envisaged that forming a recess 18 designed to accommodate and optically align a variety of sub-assemblies 20 may be applied to any of the recesses 18 disclosed in this application.

The sub-assembly 20 in this example may be resized to form a different version of the sub-assembly 20 with secondary lateral reference surfaces 30 locatable against a separate set of primary lateral reference surfaces 28 on the motherboard 2. The resizing of the sub-assembly 20 may take place when not all of the features of the sub-assembly 20 are required in the optical assembly 1. For example, the glue trench may not be needed and as such may be removed. The removal of features on a sub-assembly 20 may or may not require new secondary lateral reference surfaces 30 to be formed. Where new secondary lateral reference surfaces 30 are required, resizing the sub-assembly 20 may take place for example by etching, dicing and precision polishing or any other suitable process or processes that leave suitable secondary lateral reference surfaces 30 locatable to the primary lateral reference surfaces 28 of the recess 18.

6th Example

Figure 14A:
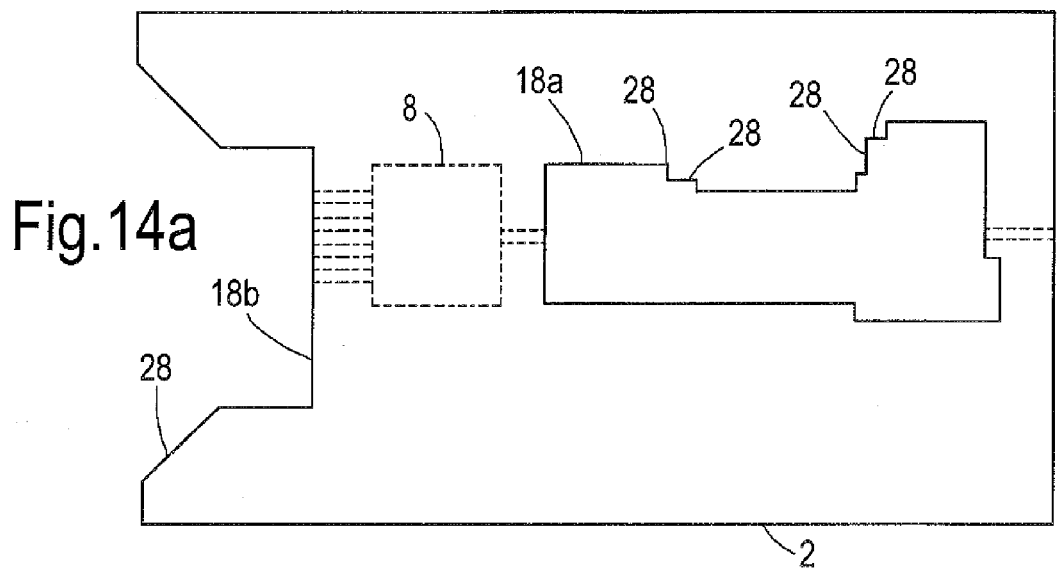

Further to the previous examples is a sixth example of the present invention described as follows and shown in FIGS. 14 and 15. In this example, multiple optical components 22 are integrated onto the motherboard 2. FIG. 14a shows an example of a motherboard 2 comprising two recesses 18a, 18b. The first recess 18a has an in-plane shape that is adapted to integrate two sub-assemblies 20 in adjacent positions. The second recess 18b is similar to that described in the previous fifth example and is adapted to integrate and optically align a variety of sub-assemblies 20 carrying optical fibre arrays. The motherboard 2 in this example comprises integrated optical waveguide 8 circuits that optically couple to the daughterboard-optical components 22 of the sub-assemblies 20.

Figure 14B:
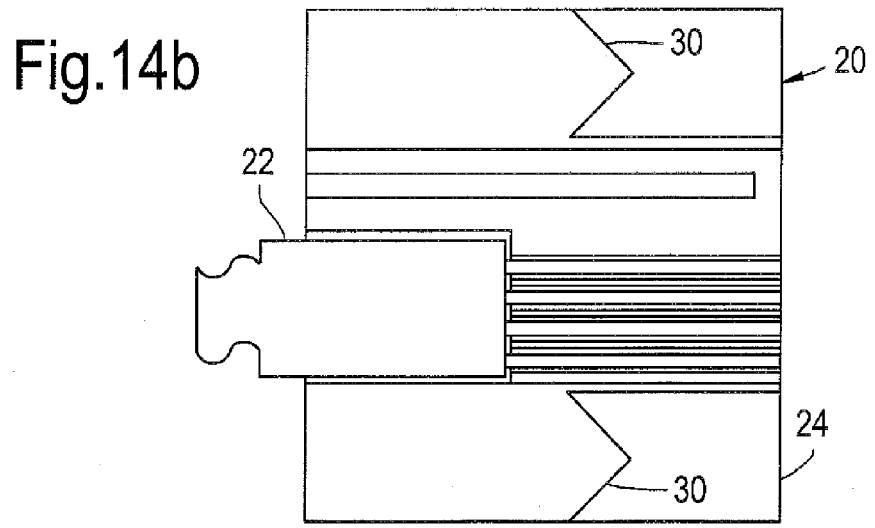
Figure 14C:
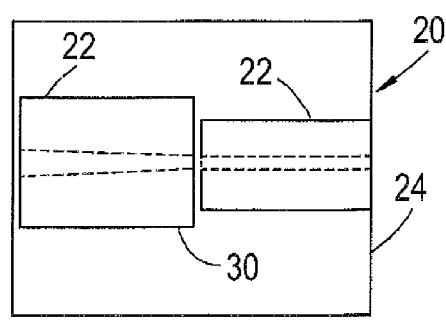
Figure 14D:
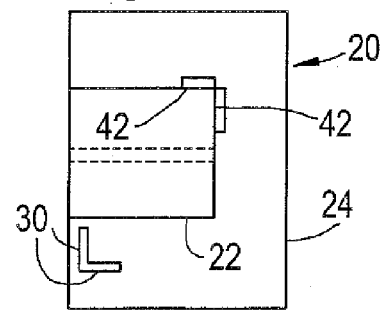
Figure 15:
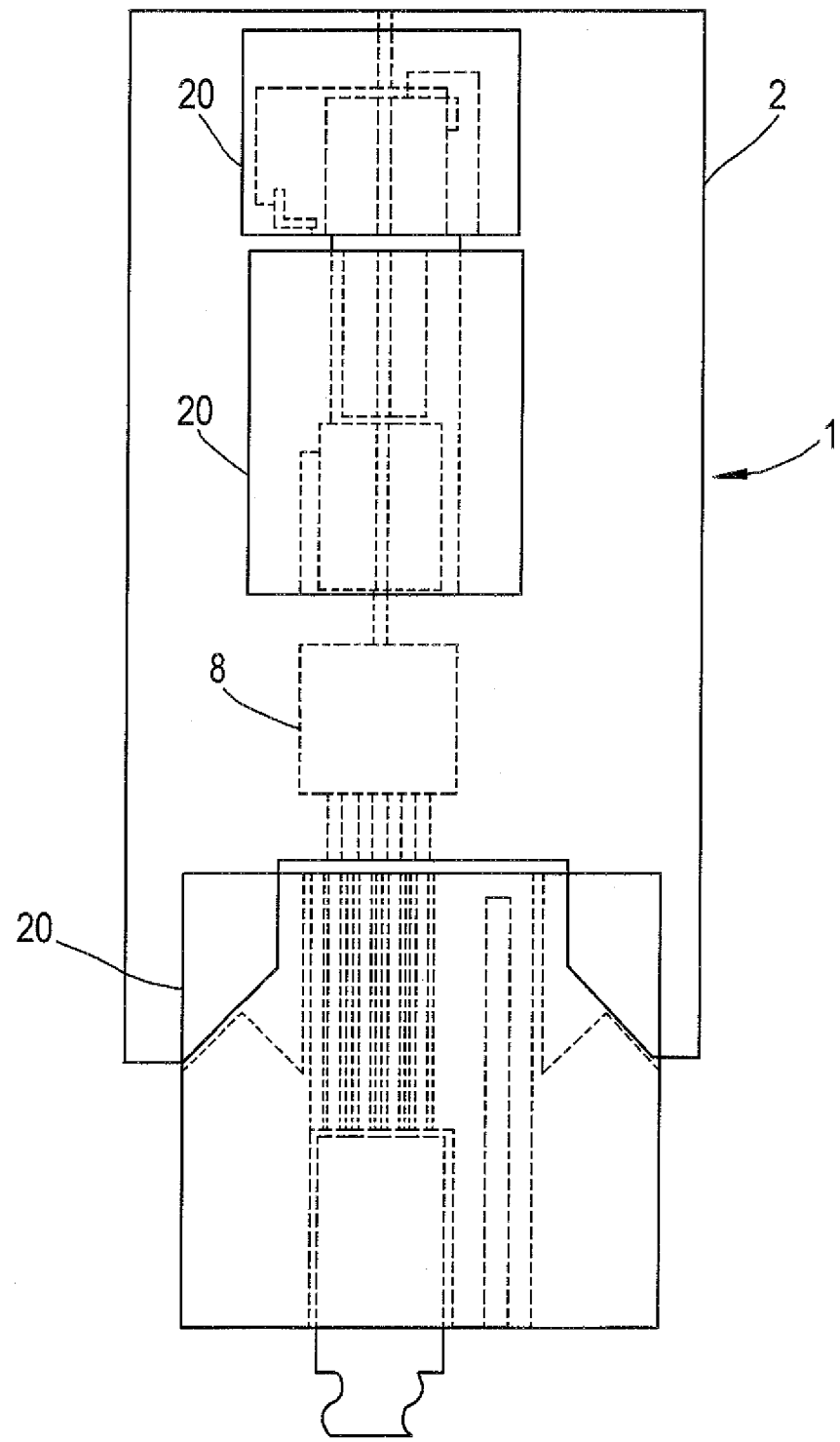

The sub-assemblies in this example are shown in FIGS. 14b to 14d where the sub-assemblies shown in 14c and 14d are those that are located in the first recess 18a while the sub-assembly shown in 14b is that located in the second recess 18b. FIG. 14b is a sub-assembly 20 similar to that described in the fifth example except that there are two arrow shaped locating sections providing two sets of secondary lateral reference surfaces 30. FIG. 14c is a sub-assembly 20 similar to that shown in FIG. 4 and comprises two optical components 22 mounted and pre-aligned on the daughterboard. The secondary lateral reference surfaces 30 on this sub-assembly 20 are located on two exposed surfaces of one of the mounted daughterboard-optical components 22. FIG. 14d is a sub-assembly 20 similar to that shown in FIG. 5. The secondary lateral reference surfaces 30 on this sub-assembly 20 are provided by stops similar to those described in the second example.

The first recess 18a comprises primary lateral reference surfaces 28 that optically align the daughterboard-optical components 22 of the sub-assemblies shown in 14c and 14d to the integrated waveguides 8 of the motherboard 2. The primary lateral reference surfaces 28 also are operative to provide lateral optical alignment between these two sub-assemblies 20.

In this example, the motherboard 2 is therefore not only operative to align primary optical components 10 to daughterboard-optical components 22 but also acts as a mounting platform for aligning daughterboard-optical components 22 together. Because the primary lateral reference surfaces 28 for all the sub-assemblies 20 are formed in the same processing step, variations in the position of certain reference surfaces resulting from over/under etching or mask misalignment are common between all the primary lateral reference surfaces 28 and therefore have a compensating effect. FIG. 15 shows the optical assembly 1 where all the sub-assemblies 20 are flip-chip integrated onto the motherboard 2.

Further variations on this illustrative example could include primary lateral reference surfaces 28 and sub assemblies 20 adapted as described in any of the examples described in this invention and may also accommodate and optically align multiple adjacent sub assemblies 20 in the same recess 18. The recesses 18 of the present invention may also comprise sets of primary lateral reference surfaces 28 designed to integrate the same or different sub assemblies 20 in a multitude of optional positions or orientations.

The invention claimed is:

1. An assembly of optically linked optical components comprising:
   a motherboard having one or more primary lateral reference features, wherein one or more of the primary lateral reference features are optical alignment features;
   a sub-assembly comprising an optical component mounted on a daughterboard, the sub-assembly having one or more secondary lateral reference features and the daughterboard comprising one or more tertiary lateral reference features in predefined position relative to the secondary lateral reference features, wherein alignment of the optical component with respect to the secondary lateral reference features is provided through alignment of the optical component with the tertiary lateral reference features and wherein the daughterboard is mounted on the motherboard such that alignment of the daughterboard with respect to the motherboard is provided through alignment of the primary lateral reference features and the secondary lateral reference features; and
   wherein the motherboard comprises a waveguide layer, and one of the primary lateral reference features is defined within the waveguide layer.

2. The assembly of claim 1, wherein one of the secondary lateral reference features and one of the tertiary lateral reference features are parallel and face the same direction.

3. The assembly of claim 1, wherein the motherboard comprises a waveguide layer, and one of the primary lateral reference features at least partially covers an alignment feature defined in the waveguide layer.

4. The assembly of claim 1, wherein the secondary lateral reference features comprise one or more secondary lateral surfaces or marks defined within and/or on a surface of the daughterboard.

5. The assembly of claim 1, wherein the primary lateral reference features or the secondary lateral reference features are a visually identifiable layer.

6. The assembly of claim 1, wherein the motherboard further comprises a recess and wherein the daughterboard is mounted on the motherboard such that the optical component extends into the recess.

7. The assembly of claim 6, wherein:
   at least part of a face of the motherboard provides a primary depth reference surface;
   the daughterboard comprises a secondary depth reference surface; and
   transverse alignment of the component through the recess is provided by contact between the primary depth reference surface and the secondary depth reference surface.

8. The assembly of claim 1, wherein the primary lateral reference features and the secondary lateral reference features provide lateral alignment in two dimensions.

9. A method of forming an assembly of optically linked optical components the method comprising:
   providing a motherboard having one or more primary lateral reference features;
   providing a sub-assembly comprising a daughterboard and one or more secondary lateral reference features, the daughterboard comprising one or more tertiary lateral reference features in predefined position relative to the secondary lateral reference features;
   aligning an optical component with the tertiary lateral reference features;
   optically aligning the primary lateral reference features and the secondary lateral reference features; and
   forming the one or more secondary lateral reference features on the optical component.

10. The method of claim 9, further comprising:
providing a primary depth reference surface on at least part of a face of the motherboard;
providing a secondary depth reference surface on the sub-assembly; and
locating the secondary depth reference surface against the primary depth reference surface.

11. The method of claim 10, further comprising flip chip mounting the daughterboard to the motherboard.

12. The method of claim 9, further comprising:
forming the one or more secondary lateral reference features on the daughterboard.

13. The method of claim 9, wherein aligning the optical component with the tertiary lateral reference features comprises locating the optical component against the one or more tertiary lateral reference features.

14. The method of claim 9, further comprising forming one or more stops on the daughterboard, the one or more stops comprising the one or more secondary lateral reference features and the one or more tertiary lateral reference features.

15. The method of claim 14, wherein an etching process is used in the formation of:
the one or more stops.

16. The method of claim 15, wherein the etching process is an ICP etching process.

17. An assembly of optically linked optical components comprising:
a motherboard comprising a face, a recess extending from the face, and a primary lateral reference feature at least partially covering an alignment feature defined in a waveguide layer, at least part of the face of the motherboard providing a primary depth reference surface; and
a sub-assembly comprising an optical component mounted on a daughterboard and a secondary lateral reference feature, the daughterboard providing a secondary depth reference surface, wherein the daughterboard is flip chip mounted on the motherboard such that the optical component extends into the recess, and wherein lateral alignment of the optical component with respect to the motherboard is provided through alignment of the primary lateral reference feature and the secondary lateral reference feature and transverse alignment of the optical component through the recess is provided by contact between the primary depth reference surface and the secondary depth reference surfaces.

18. The assembly of claim 17, wherein one or more of the primary lateral reference feature or the secondary lateral reference feature are optical alignment features.

* * * * *